(12) United States Patent
Shugart

(10) Patent No.: US 11,798,020 B2
(45) Date of Patent: Oct. 24, 2023

(54) MANAGING VENDOR OFFERS

(71) Applicant: YCS GROUP, LLC, Kansas City, MO (US)

(72) Inventor: Sid T. Shugart, Kansas City, MO (US)

(73) Assignee: YCS Group, LLC, Kansas City, MO (US)

(*) Notice: Subject to any disclaimer, the term of this patent is extended or adjusted under 35 U.S.C. 154(b) by 0 days.

(21) Appl. No.: 16/908,653

(22) Filed: Jun. 22, 2020

(65) Prior Publication Data
US 2020/0320563 A1 Oct. 8, 2020

Related U.S. Application Data

(63) Continuation of application No. 13/843,015, filed on Mar. 15, 2013, now Pat. No. 10,692,104, which is a continuation-in-part of application No. 13/664,079, filed on Oct. 30, 2012, now abandoned.

(51) Int. Cl.
*G06Q 30/0226* (2023.01)

(52) U.S. Cl.
CPC ............... *G06Q 30/0231* (2013.01)

(58) Field of Classification Search
CPC ............. G06Q 30/0231; G06Q 20/209; G06Q 30/0211; G06Q 30/0245; G06Q 30/0251; G06Q 30/0255; G06Q 30/0269; G06Q 40/10; G06Q 30/0207–0277
See application file for complete search history.

(56) References Cited

U.S. PATENT DOCUMENTS

| | | |
|---|---|---|
| 7,270,276 B2 | 9/2007 | Vayssiere |
| 8,489,452 B1 | 7/2013 | Warner et al. |
| 9,483,769 B2 | 11/2016 | Rajan et al. |
| 2002/0046116 A1 | 4/2002 | Hohle et al. |
| 2002/0073026 A1 | 6/2002 | Gruber et al. |
| 2002/0082920 A1 | 6/2002 | Austin et al. |
| 2004/0167815 A1 | 8/2004 | DeLaHunt |
| 2006/0004629 A1 | 1/2006 | Neemann et al. |
| 2006/0074755 A1 | 4/2006 | Juetten et al. |

(Continued)

FOREIGN PATENT DOCUMENTS

| | | |
|---|---|---|
| CN | 101950217 A | 1/2011 |
| CN | 102187353 A | 9/2011 |
| CN | 102257524 A | 11/2011 |

OTHER PUBLICATIONS

First Examination Report received for Australian Patent Application No. 2019229375, dated Nov. 7, 2020, 3 pages.
"Graphical user interface", Wikipedia, Retrieved from the Internet URL: https://en.wikipedia.org/w/index.php?title=Graphical user interface &oldid=509946180, on Aug. 13, 2020, pp. 1-8 (Aug. 2012).

(Continued)

*Primary Examiner* — Chinyere Mpamugo
(74) *Attorney, Agent, or Firm* — Shook, Hardy & Bacon L.L.P.

(57) ABSTRACT

A system, method, and computer-readable media are described for facilitating management of electronic vendor offers. A user device with a graphical user interface and a display includes a vender offer manager and is coupled with a communication network. The display selectively shows one or more of a front face image and a rear face image, one or more electronic discount cards, one or more electronic loyalty cards and/or one or more electronic coupons, as well as a user-selectable image rotation icon. The user may rotate between the different cards.

20 Claims, 20 Drawing Sheets

(56) References Cited

U.S. PATENT DOCUMENTS

| | | | |
|---|---|---|---|
| 2006/0089874 | A1 | 4/2006 | Newman et al. |
| 2007/0088612 | A1 | 4/2007 | Simonian |
| 2008/0059305 | A1 | 3/2008 | Etuk et al. |
| 2008/0059306 | A1 | 3/2008 | Fordyce et al. |
| 2009/0036103 | A1 | 2/2009 | Byerley et al. |
| 2009/0076912 | A1 | 3/2009 | Rajan et al. |
| 2009/0228822 | A1 | 9/2009 | Miyata |
| 2009/0288012 | A1* | 11/2009 | Hertel .............. G06Q 20/105 715/769 |
| 2010/0063906 | A1 | 3/2010 | Nelsen et al. |
| 2010/0088188 | A1 | 4/2010 | Kumar et al. |
| 2010/0114685 | A1 | 5/2010 | Blass |
| 2010/0205274 | A1 | 8/2010 | Gharabally et al. |
| 2010/0250351 | A1 | 9/2010 | Gillenson et al. |
| 2011/0029362 | A1 | 2/2011 | Roeding et al. |
| 2011/0068170 | A1 | 3/2011 | Lehman |
| 2011/0307318 | A1 | 12/2011 | LaPorte et al. |
| 2012/0150606 | A1 | 6/2012 | Navar et al. |
| 2012/0253932 | A1 | 10/2012 | Kim et al. |
| 2012/0265800 | A1 | 10/2012 | Tuchman et al. |
| 2012/0290384 | A1 | 11/2012 | Castaneda |
| 2013/0085831 | A1 | 4/2013 | Witherspoon, Jr. et al. |
| 2013/0159081 | A1 | 6/2013 | Shastry et al. |
| 2013/0204690 | A1 | 8/2013 | Liebmann |
| 2013/0262212 | A1 | 10/2013 | Shevelenko et al. |
| 2014/0025519 | A1* | 1/2014 | Thomas .............. G06F 16/2455 705/41 |
| 2015/0032524 | A1 | 1/2015 | Fisher |

OTHER PUBLICATIONS

"Punchcard Demo 2012", my punchcard, Retrieved from the Internet URL: http://www.youtube.com/watch?v+okxZpnp7tSY> entire video on May 19, 2014, pp. 2 (Aug. 2012).

Weiss, A., "Regal Crown Club Card Review", CinemaFunk.com, Retrieved from the Internet URL: http://www.cinemafunk.com/fiim-blog/regal-crown-club-card-review.html> on Mar. 5, 2012, pp. 3 (Sep. 2012).

Office Action received for Canadian Patent Application No. 2,888,813, dated Aug. 21, 2020, 5 pages.

Extended European Search Report and Opinion received for European Patent Application No. 20185821.4, dated Aug. 25, 2020, 9 pages.

Second Examination Report received for Australian Patent Application No. 2019229375, dated Nov. 1, 2021, 3 pages.

Canadian Notice of Allowance received for Canadian Patent Application No. 2,888,813, dated Jun. 11, 2021, 1 page.

Non-Final Office Action dated Oct. 26, 2021 in U.S. Appl. No. 16/908,484, 10 pages.

Notice of Allowance dated Mar. 23, 2022 in U.S. Appl. No. 16/908,484, 8 pages.

First Examination Report received for Australian Patent Application No. 2021261891, dated Jan. 3, 2023, 4 pages.

Office Action received for European Patent Application No. 20185821.4, dated Jan. 4, 2023, 5 pages.

Non-Final Office Action dated Aug. 17, 2023 in U.S. Appl. No. 18/085,047, 9 pages.

Non-Final Office Action dated Aug. 31, 2023 in U.S. Appl. No. 17/878,717, 17 pages.

\* cited by examiner

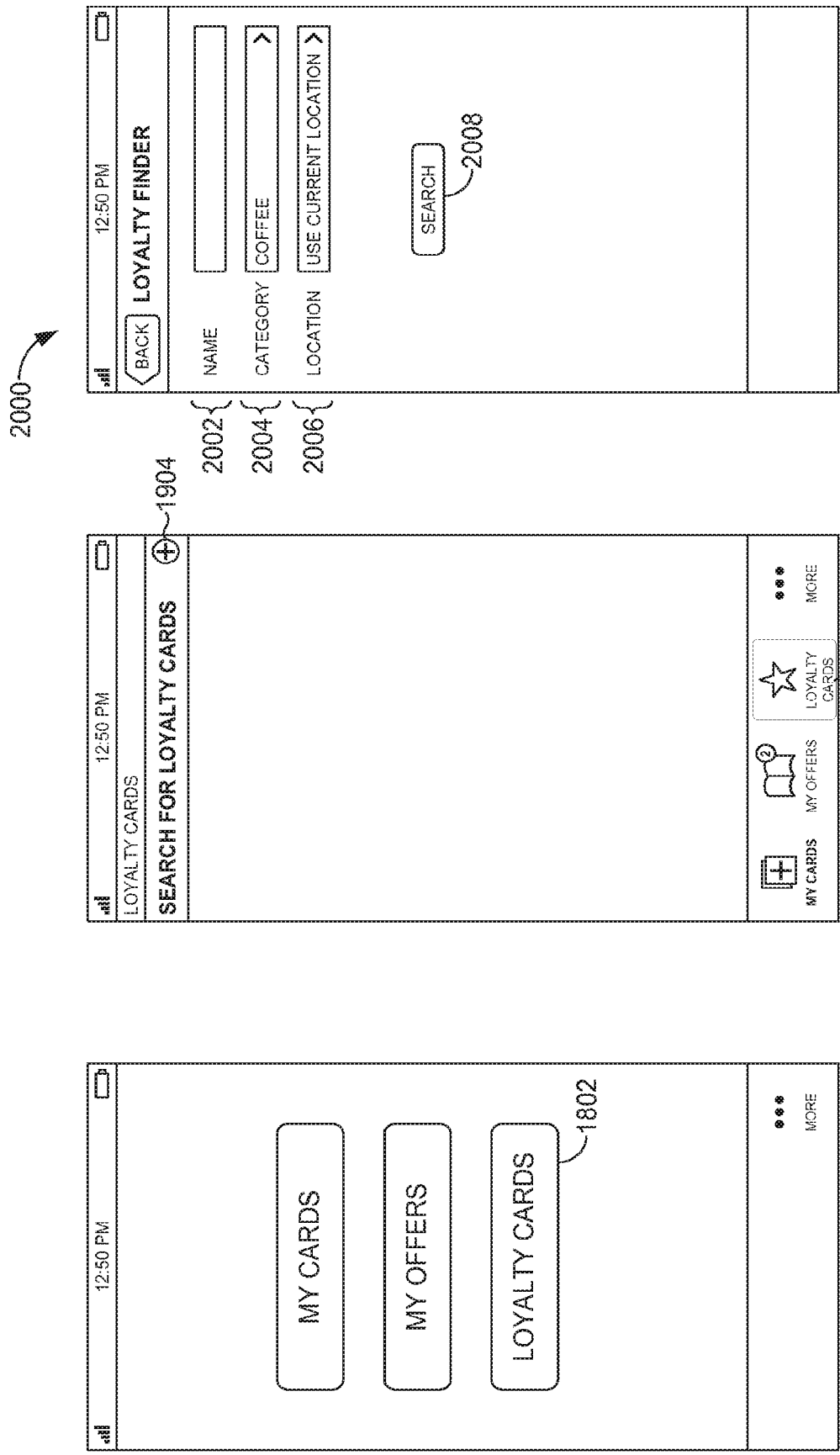

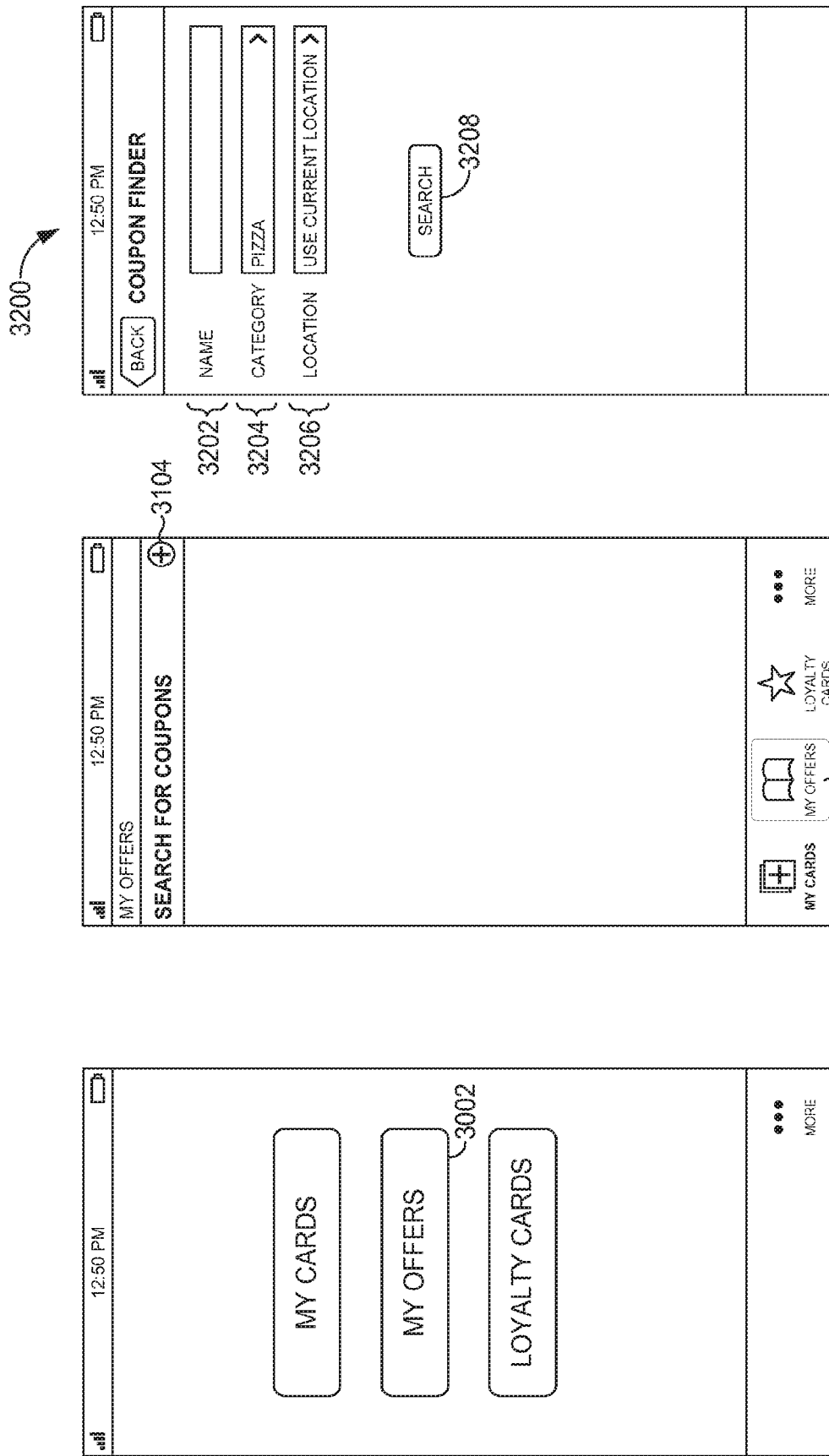

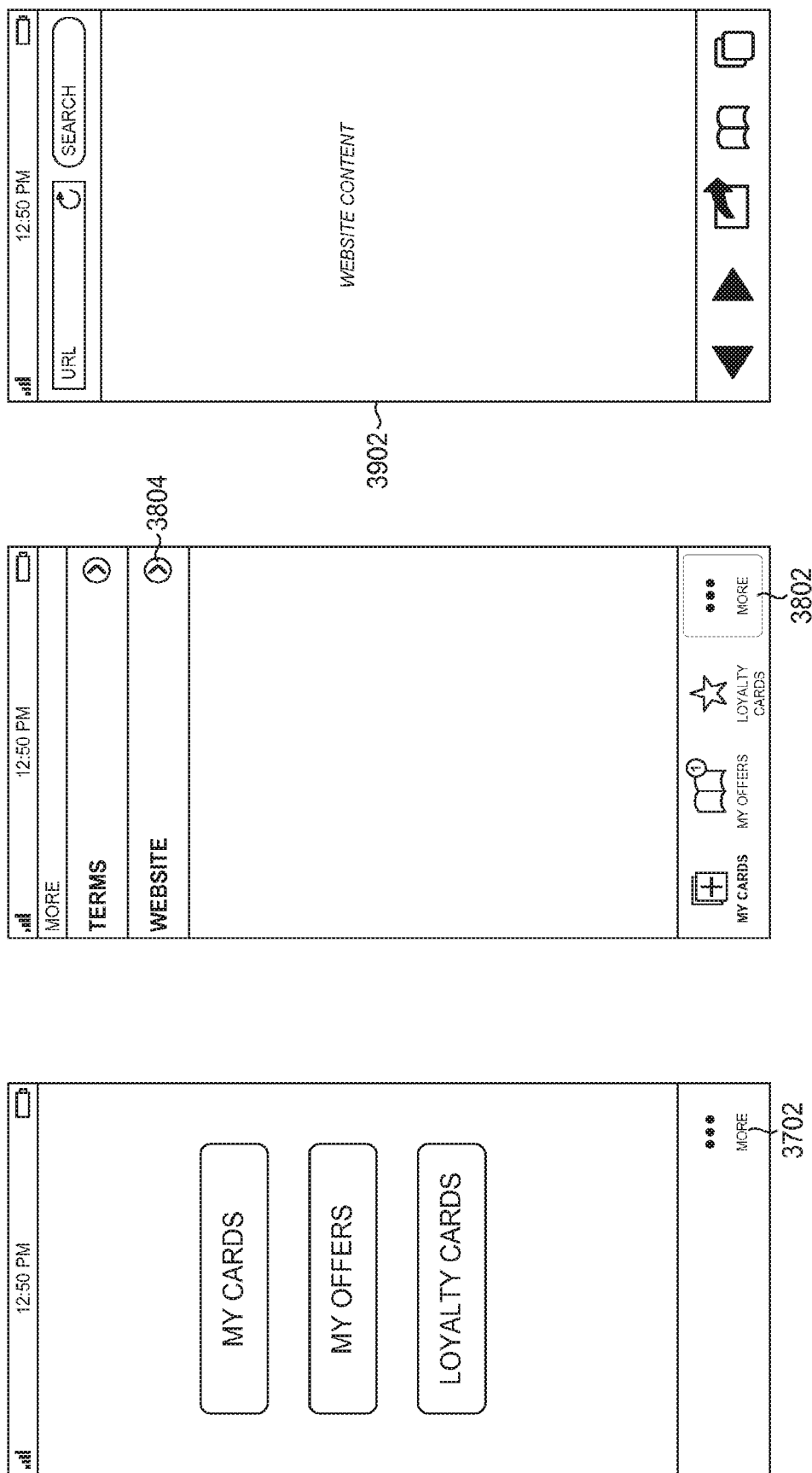

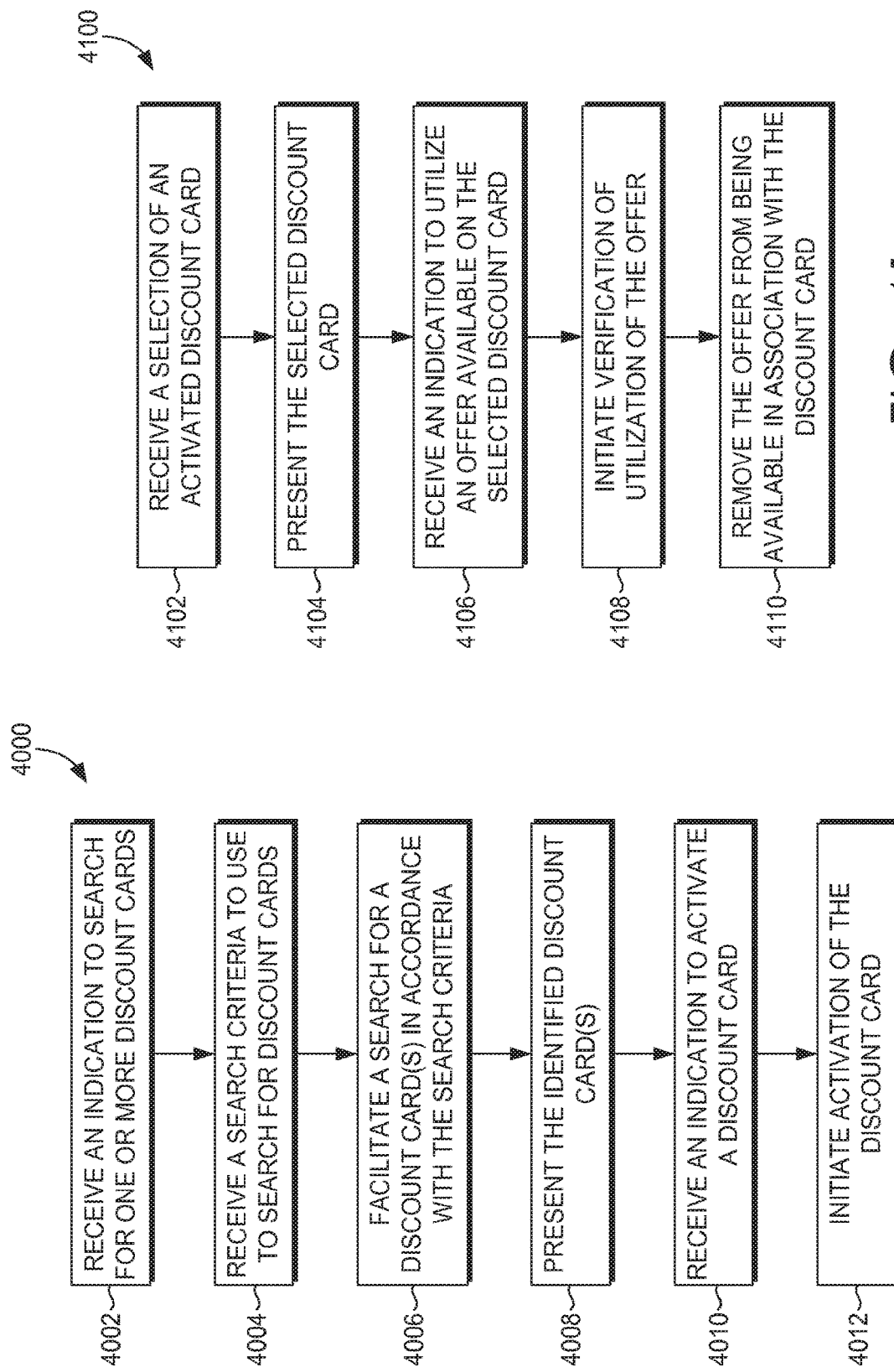

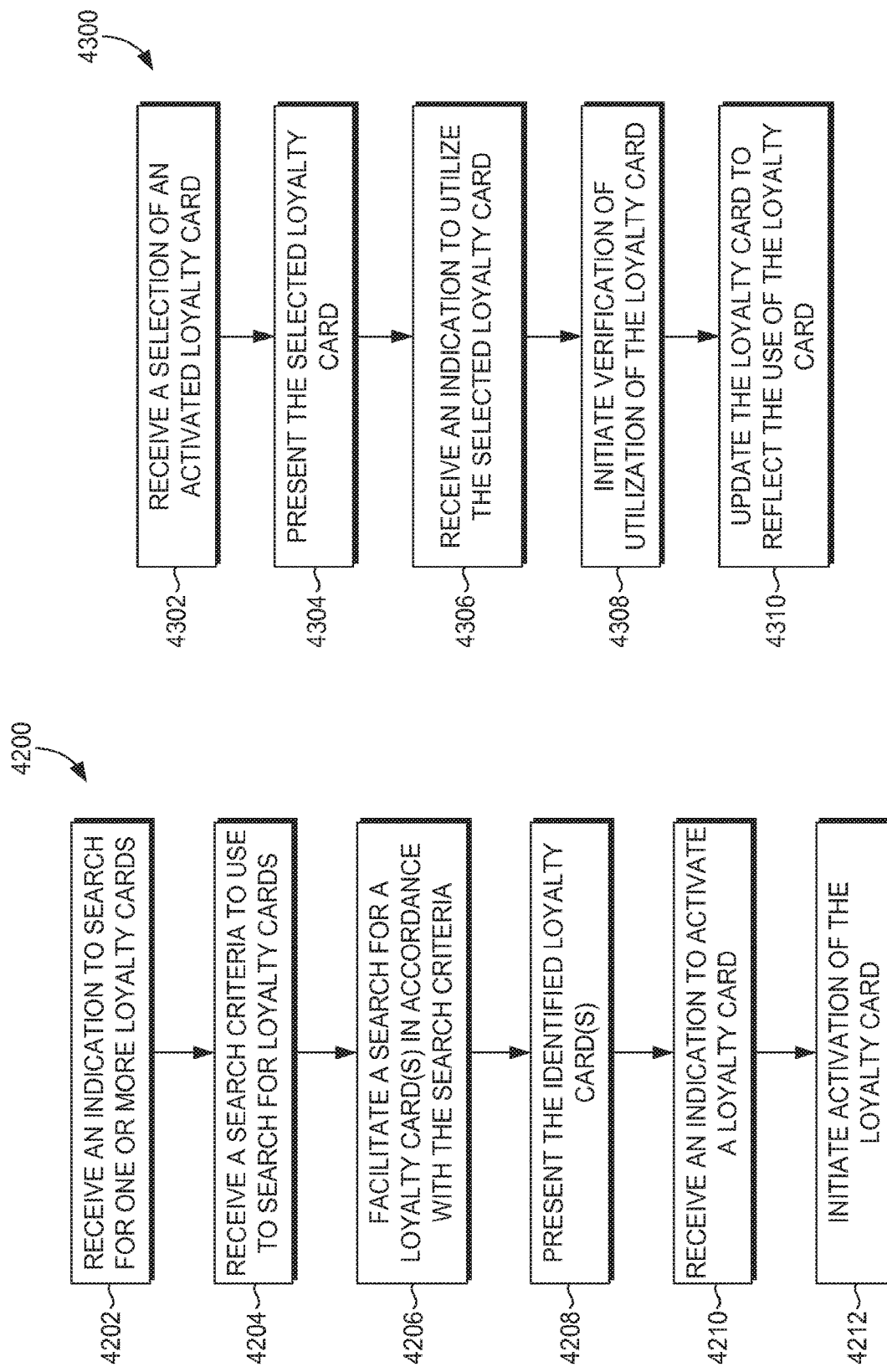

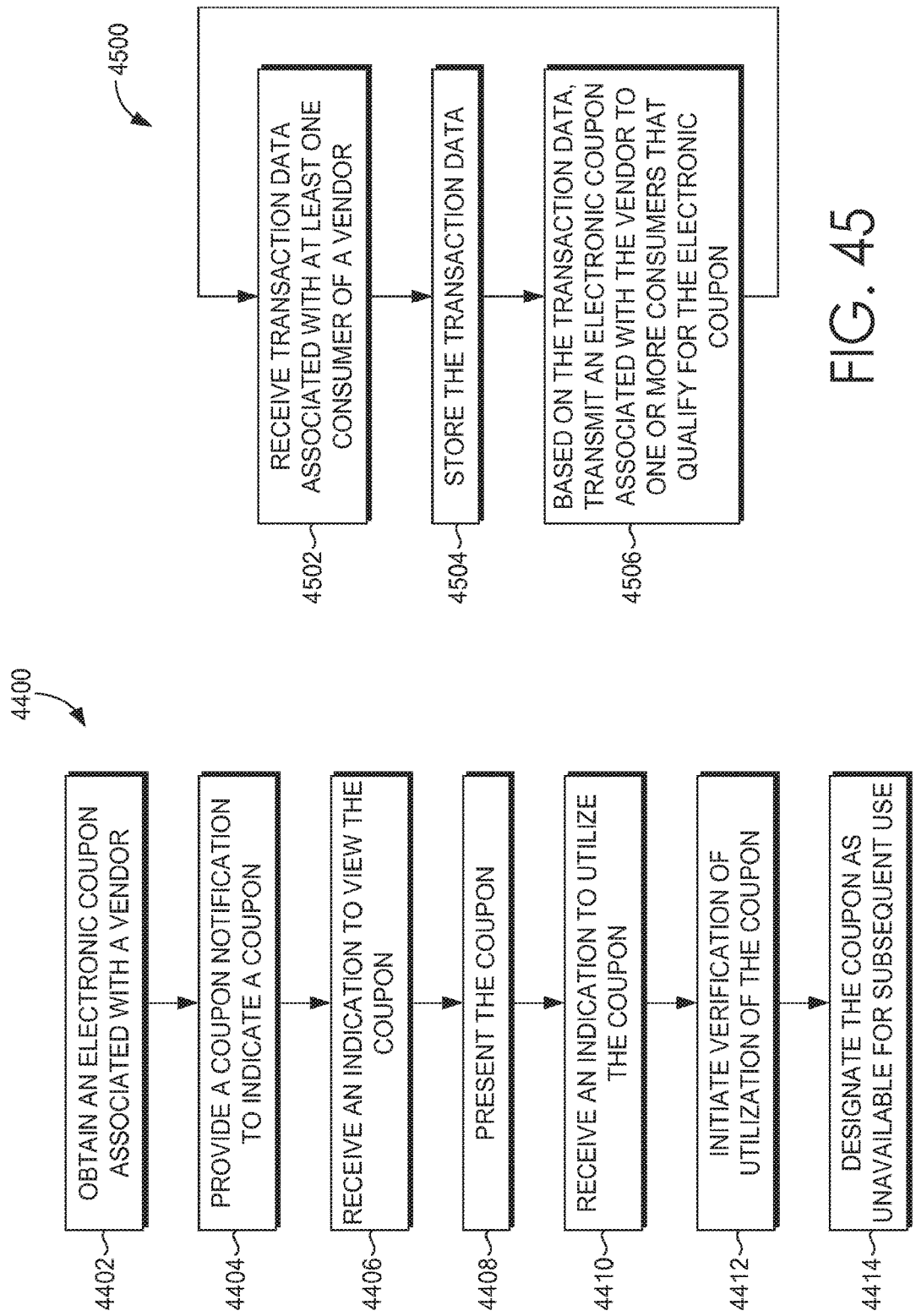

MANAGING VENDOR OFFERS

CROSS-REFERENCE TO RELATED APPLICATIONS

The present application is a continuation of application Ser. No. 13/843,015, filed Mar. 15, 2013, which was a continuation-in-part of application Ser. No. 13/664,079, filed Oct. 30, 2012. The entirety of the aforementioned applications are incorporated by reference herein.

SUMMARY OF THE INVENTION

Embodiments of the present invention enable managing one or more types of electronic vendor offers. That is, embodiments of the present invention allow a user to obtain and utilize electronic offers or "gifts" provided by vendors on his or her user device. An electronic vendor offer refers to an offer provided by a vendor that can be electronically accessed and redeemed via a user device. In this regard, a user can utilize a mobile device at a participating vendor to use or redeem an offer associated with the vendor (e.g., present an offer to a vendor and receive a discount or reward in exchange). Such vendor offers that may be utilized via embodiments of the present invention include offers provided in association with electronic discount cards, electronic loyalty cards, and/or electronic coupons, as described more fully below.

In a first illustrative embodiment, one or more computer-readable media having computer-executable instructions embodied thereon for performing a method of facilitating managing vendor offers is provided. The method includes providing at least a portion of a loyalty card. The loyalty card includes a plurality of loyalty portions associated with a vendor that indicate loyalty of a user based on interaction with the vendor. An indication to fulfill one of the loyalty portions provided on the loyalty card is received. Upon fulfilling one of the loyalty portions, providing an indication that one of the loyalty portions is completed.

In another illustrative embodiment, a method of facilitating managing offers is provided. The method includes activating a virtual loyalty card associated with an entity such that the virtual loyalty card can be accessed and used in association with the entity via a mobile device, the entity comprising an educational institution or a non-profit organization. An indication is received, via the mobile device, that an event associated with the entity has been attended. Based on the attendance of the event, it is determined that attendance has been completed for a predetermined number of entity events. Thereafter, an offer is provided for completion of attending the predetermined number of entity events.

In a third illustrative embodiment, one or more computer-readable media having computer-executable instructions embodied thereon for performing a method of facilitating managing entity offers. The method includes receiving data associated with one or more interactions between a user and an entity. The data is stored in association with the entity. Based on the data associated with the one or more interactions between the user and the entity, an electronic coupon is provided to a mobile device of the user for the user to redeem in association with the entity.

BRIEF DESCRIPTION OF THE DRAWINGS

Illustrative embodiments of the present invention are described in detail below with reference to the attached drawing figures, which are incorporated by reference herein and wherein:

FIG. 5 is a drawing illustrating a user interface for providing group search results, in accordance with an embodiment of the present invention;

FIG. 6 is a drawing illustrating a user interface allowing a user to search for a discount card(s) using a vendor search, in accordance with an embodiment of the present invention;

FIG. 7 is a drawing illustrating a user interface for providing vendor search results, in accordance with an embodiment of the present invention;

FIG. 18 is a drawing illustrating a graphical user interface for selecting a loyalty cards feature, in accordance with an embodiment of the present invention;

FIG. 19 is a drawing illustrating a graphical user interface for selecting to search for loyalty cards, in accordance with an embodiment of the present invention;

FIG. 20 is a drawing of a user interface for searching for a loyalty card(s), in accordance with an embodiment of the present invention;

FIG. 30 is a drawing illustrating a graphical user interface for selecting an electronic coupons feature, in accordance with an embodiment of the present invention;

FIG. 31 is a drawing illustrating a graphical user interface for selecting to search for electronic coupons, in accordance with an embodiment of the present invention;

FIG. 32 is a drawing of a user interface for searching for an electronic coupon(s), in accordance with an embodiment of the present invention;

FIG. 37 is a drawing illustrating a graphical user interface allowing a user to view more details associated with a vendor offer application, in accordance with an embodiment of the present invention;

FIG. 38 is a drawing illustrating a graphical user interface for providing an option to view terms and a website associated with a vendor offer application, in accordance with an embodiment of the present invention;

FIG. 39 is a drawing illustrating a graphical user interface for providing a website associated with a vendor offer application, in accordance with an embodiment of the present invention;

FIG. 40 is a flow diagram in which a method of activating a discount card is described, in accordance with an embodiment of the present invention;

FIG. 41 is a flow diagram in which a method of using a discount card is described, in accordance with an embodiment of the present invention;

FIG. 42 is a flow diagram in which a method of activating a loyalty card is described, in accordance with an embodiment of the present invention;

FIG. 43 is a flow diagram in which a method of using a loyalty card is described, in accordance with an embodiment of the present invention;

FIG. 44 is a flow diagram in which a method of using an electronic coupon is described, in accordance with an embodiment of the present invention;

FIG. 45 is a flow diagram in which a method of providing an electronic coupon is described, in accordance with an embodiment of the present invention.

DETAILED DESCRIPTION OF THE INVENTION

Embodiments of the present invention provide systems and methods for facilitating electronic management of various forms of vendor offers. That is, embodiments of the present invention enable managing one or more types of electronic vendor offers. An electronic vendor offer refers to an offer or "gift" provided by a vendor that can be electronically accessed and redeemed via a user device. In this regard, a user can utilize a mobile device at a participating vendor to use or redeem an offer associated with the vendor (e.g., present an offer to a vendor and receive a discount or reward in exchange). Such vendor offers that may be utilized via embodiments of the present invention include offers provided in association with electronic discount cards, electronic loyalty cards, and/or electronic coupons, as described more fully below.

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-executable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

An Illustrative Operating Environment

Figure 1:
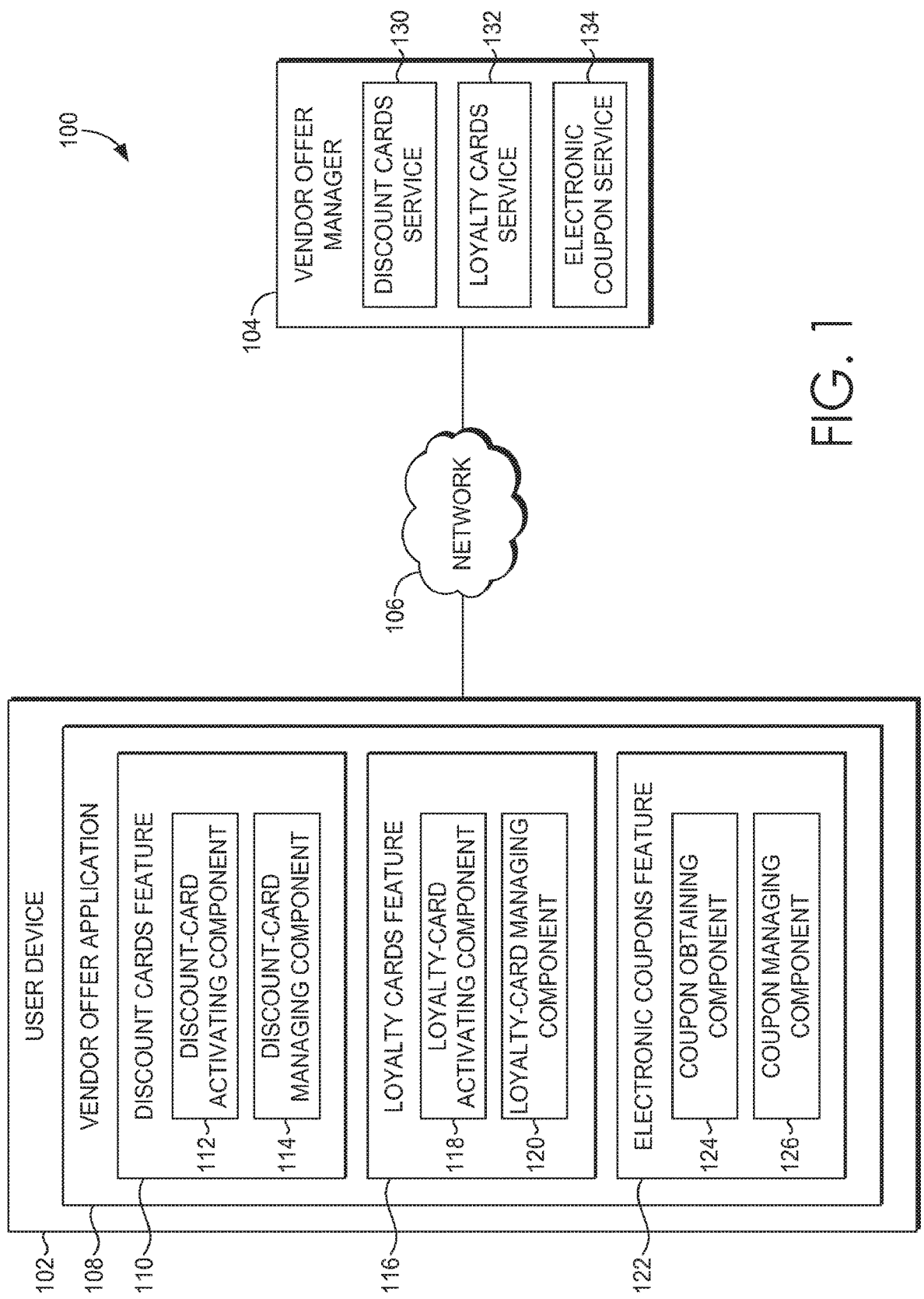
FIG. 1 is a drawing of an illustrative environment in which an embodiment of the present invention may operate.

Embodiments of the present invention may be practiced in a communications network providing service to devices communicatively coupled to the communications network. An illustrative operating environment 100 that contains a few of the components within such a communications network is shown in FIG. 1. The components shown in FIG. 1 are the primary components that embodiments of the invention may interact with during operation. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components.

Illustrative operating environment 100 includes user device 102, vendor offer manager 104, and network 106. The user device 102 and the vendor offer manager 104 can communicate by way of network 106. Network 106 may include one or more mobile networks, one or more packet-based networks, including the Internet, and the public switched telephone network ("PSTN"). The various components within network 106 may be owned and/or operated by multiple entities, commercial or otherwise. The present invention is not limited to embodiments that include a wireless device or a wireless network. However, the present invention may operate in a wireless network and with wireless devices. Accordingly, a wireless network illustrates one possible operating environment.

User device 102 can be a wireless communications device communicating via network 106. In embodiments, user device 102 is a wireless terminal that is adapted to receive communications and media over a network 106, such as a wireless network, included in illustrative operating environment 100. Some lower-level details of user device 102 are not shown so as to not obscure embodiments of the present invention. For example, user device 102 may include a bus that directly or indirectly couples the following devices: memory; one or more processors; one or more presentation components such as a display or speaker; input/output (I/O) ports; I/O components; and a power supply such as a battery. User device 102 may communicate via wireless protocols, such as code division multiple access ("CDMA"), global system for mobile communications ("GSM"), or time division multiple access ("TDMA"), as well as others, to communicate with a base station.

User device 102 may take on any of a variety of forms. By way of example, user device 102 may be a mobile telephone, smart phone, laptop computing device, desktop computing device, server, personal digital assistant ("PDA") or any combination of these or other devices. The user device 102 may be associated with a user. The user is the ultimate recipient of communications (e.g., emails, phone calls, text messages) and content sent to user device 102.

The vendor offer manager 104 may be a combination of hardware and software. Such a vendor offer manager 104 may, in some embodiments, be used for transmitting web pages, applications, and/or other content to a requesting device, or a portion thereof (e.g., web browser or application). The hardware aspect includes a computing device that includes a CPU, short-term memory, long-term memory, and one or more network interfaces. A network interface is used to connect to a LAN, WAN (including the Internet), or other variety of communication network, such as network 106. The network interface to the WAN or LAN could be wired, wireless, or both. Software on the vendor offer manager 104 allows communication with other computers connected to a common network through the network interface. The software facilitates receiving requests, retrieving the requested data, and transmitting the requested data to the requesting device, or portion thereof. The software may also provide security and authentication functions. The vendor offer manager 104 includes a variety of computer-readable media and the ability to access and execute instructions contained on the media. The above description of hardware and software is illustrative only; many other features were not listed so as to not obscure embodiments of the present invention.

In operation, electronic vendor offers can be managed at the user device 102 and/or a device remote from the user device 102, such as the vendor offer manager 104. An offer can be any discount or reward, such as, for example, a discount of an item(s) or service(s), a free item(s) or service(s), a point(s), etc. An electronic vendor offer refers to an offer provided by a vendor that can be electronically accessed and redeemed. In this regard, a user can utilize a mobile device at a participating vendor to use or redeem an offer associated with the vendor. An electronic vendor offer is an offer provided in electronic form by way of a graphical user interface on a display screen of a user computing device. As such, an electronic vendor offer is not a physical or tangible offer provided via a tangible coupon or card.

Vendor offers that may be managed via embodiments of the present invention include vendor offers provided in association with electronic discount cards, electronic loyalty cards, and/or electronic coupons. An electronic discount card, as used herein, refers to an electronic card having a plurality of offers associated with a vendor or group of vendors. In embodiments, an electronic discount card refers to an electronic fundraising card. An electronic fundraising card is an electronic card that is used to facilitate fundraising for a particular entity (e.g., a non-profit organization, an educational organization, a community organization, a recreational group, etc.). In some embodiments, a fundraising card or discount card is associated with a single vendor. In other embodiments, a fundraising card or discount card is associated with multiple vendors. A vendor refers to an entity offering a service and/or product for purchase or sale (e.g., a retailer or merchant). By way of example only, and without limitation, a vendor might be a grocery store, a clothing store, a department store, a restaurant, a bar, a theater, or any other business that provides services and/or products to consumers. Although vendor is generally described as a commercial entity, embodiments herein contemplate a vendor being a non-profit organization, a government entity, a scholastic entity (e.g., a school or school organization), or any organization or entity that wishes to incorporate electronic discount cards, electronic loyalty cards, and/or electronic coupons. In this context, a school can offer, for example, loyalty cards to students, faculty, parents, alumni, and/or supporters to reward their loyalty for supporting the school (e.g., attending a game or program).

An electronic loyalty card refers to an electronic card that is used to facilitate tracking loyalty of consumers for a particular vendor and rewarding such loyalty with an offer(s). Generally, a loyalty card is specific to a particular vendor to track a consumer's transactions, interactions, or participations with the vendor (i.e., loyalties with the vendor). For example, a loyalty card might track a number of visits the consumer has made to the vendor, a number of purchases a consumer has made with the vendor, an amount of money the consumer has paid to the vendor, a number of participations corresponding with the vendor, or the like. With a loyalty card, a user is provided with an offer (e.g., a discount, an amount of points, a reward, etc.) from the vendor upon attaining a particular target or goal. For example, a user may be provided with a discount, points, or other offer upon attaining a particular number of visits made to the vendor, a particular number of purchases made by the consumer, a particular amount of money spent by the consumer, etc.

Facilitating management of electronic offers, and cards associated therewith (e.g., electronic discount cards or electronic loyalty cards), via a user device can be performed using various types of technology. For example, an application, such as a mobile application, that is installed, activated, and/or downloaded onto the user device 102 can be used to manage various electronic offers. FIG. 1 illustrates a vendor offer application 108 hosted on the user device 102 that is configured to manage electronic offers. In another embodiment, electronic offers can be managed by way of a website accessible through a web browser hosted on the user device 102. Although a vendor offer application 108 on the user device 102 is generally described herein for facilitating management of electronic offers, as can be appreciated, the functionality of the vendor offer application 108 can be implemented alternatively or additionally through a website accessible via a web browser of the user device 102.

The vendor offer application 108 on the user device 102 that facilitates management of an electronic vendor offer(s) can be obtained on the user device 102 in any number of ways. In one example, the vendor offer application 108 can be downloaded from a remote server, such as vendor offer manager 104, a website, or a mobile application store. In this regard, a user may provide an indication to obtain and/or utilize a vendor offer application. In response to such an indication, the vendor offer application can be requested from a server or other computing device that can provide the application, such as the vendor offer manager 104. In another example, the vendor offer application 108 may be included on the user device 102 at time of purchase of the user device. The manner in which the vendor offer application 108 is obtained by the user device 102 is not intended to limit the scope of embodiments of the present invention.

The vendor offer application 108 described in detail herein is used to manage vendor offers associated with electronic discount cards, electronic loyalty cards, and electronic coupons. In this regard, the vendor offer application 108 enables a user to redeem electronic vendor offers provided in association with discount cards, loyalty cards, and/or coupons. As such, vendor offer application 108 supports a discount card feature, a loyalty card feature, and an electronic coupon feature. As can be appreciated, however, in some embodiments, a vendor offer application can be configured to support any one or combination of features. For instance, a first vendor offer application on a user device may be configured to support the discount card feature, a second vendor offer application on the user device may be configured to support the loyalty card feature, and a third vendor offer application on the user device may be configured to support the electronic coupon feature.

In some cases, upon obtaining and initiating the vendor offer application 108 on the user device 102, terms and conditions are presented via the display screen of the user device. Such a terms and conditions screen may prompt the user to accept the delineated terms and conditions associated with the vendor offer application 108 prior to utilization of the vendor offer application 108. Upon accepting the terms and conditions applicable to the vendor offer application 108, the user can utilize the application in any manner supported by the application.

As previously described, one embodiment of the vendor offer application 108 enables utilization of electronic discount cards, electronic loyalty cards, and electronic coupons. As such, a user interface(s) provided by the vendor offer application 108 may allow a user to select which feature the user would like to utilize (e.g., electronic discount cards, electronic loyalty cards, or electronic coupons). In cases that only one feature is provided or supported by a vendor offer application, such an option to select a feature may be unnecessary.

The vendor offer application 108 of the user device 102 illustrated in FIG. 1 includes a discount cards feature 110, a loyalty cards feature 116, and an electronic coupons feature 122. In some embodiments, one or more of the illustrated components may be implemented as stand-alone applications. In other embodiments, one or more of the illustrated components may be integrated directly into the operating system of the user device 102 or other computing device, such as vendor offer manager 104. It will be understood by those of ordinary skill in the art that the components illustrated in FIG. 1 are exemplary in nature and in number and should not be construed as limiting. Any number of components may be employed to achieve the desired functionality within the scope of embodiments hereof. Further, components may be located on any number of servers or computers.

The various features supported by the vendor offer application 108 are set forth in more detail below. Further, as described below in relation to the various features, the vendor offer manager 104 can be utilized in conjunction with the vendor offer application 108 to facilitate management of vendor offers. In this regard, the vendor offer application 108 on the user device 102 may communicate with the vendor offer manager 104 to access, obtain, and/or store data useful for managing vendor offers.

Electronic Discount Cards

An electronic discount card, as used herein, refers to an electronic card having a plurality of offers (e.g., discounts) associated with a vendor or group of vendors. In some cases, discount offers provided in association with an electronic discount card are each unique. In other cases, any number of discount offers may be replicated. In embodiments, an electronic discount card refers to an electronic fundraising card that is used to facilitate fundraising for a particular entity (e.g., a non-profit organization, an educational organization, a community organization, a recreational group, etc.). In some cases, a fundraising card is associated with a single vendor. That is, a particular fundraising card includes offers from a particular vendor. In other embodiments, a fundraising card is associated with multiple vendors. In this way, a fundraising card includes offers from multiple vendors.

The discount cards feature 110 of the vendor offer application 108 includes a discount-card activating component 112 and a discount-card managing component 114. In some embodiments, one or more of the illustrated components may be implemented as stand-alone applications. In other embodiments, one or more of the illustrated components may be integrated directly into the operating system of the user device 102 or other computing device, such as vendor offer manager 104. It will be understood by those of ordinary skill in the art that the components illustrated in FIG. 1 are exemplary in nature and in number and should not be construed as limiting. Any number of components may be employed to achieve the desired functionality within the scope of embodiments hereof. Further, components may be located on any number of servers or computers.

The discount cards feature 110 is configured to enable a user to activate and/or use one or more electronic discount cards, such as fundraising cards, via the user device 102. As such, a user can electronically utilize offers provided in association with electronic discount cards. As previously described, the discount cards feature 110 can be a standalone application, be part of the vendor offer application 108, or be provided via a website accessible via a web browser. In some embodiments, and as described in more detail below, the discount cards feature 110 might access discount cards service 130 of the vendor offer manager 104 to facilitate implementation of the discount cards feature 110 on the user device.

The discount-card activating component 112 is configured to facilitate activating one or more discount cards. In this regard, the discount-card activating component 112 enables searching for desired discount cards and/or activating the discount cards.

Initially, the discount-card activating component 112 is configured to enable a user to search for a discount card(s) that may be of interest to the user. Such a search can be performed in any number of manners. In some cases, a user may search for a discount card based on an organization or entity selling discount cards. For example, a user may input or select an organization or entity to view discount cards being sold by that particular organization. Upon entering an organization name (e.g., a particular Boy Scout troop) or an indication thereof (e.g., boy scouts, code value representing entity, etc.), any discount cards associated with that particular organization can be presented. For instance, assume a user inputs "boy scouts." In such a case, more than one Boy Scout troop may be selling fundraising cards. In some cases, more than one organization is identified as being associated with the organization name or an indication thereof. In such cases, the identified organizations can be presented such that the user can select the particular organization of interest and, thereafter, view the discount cards associated with the selected organization.

Alternatively or additionally, a user may search for a discount card based on a vendor identifier (e.g., vendor name, vendor numerical identifier, etc.) associated with a vendor or a category of desired vendors for which a discount card is desired. For instance, a user desiring a discount card for pizza may input or select a category of "pizza" as an indication to view discount cards associated with pizza vendors. In such an instance, any discount cards associated with "pizza" are presented to the user. The user can then view and/or acquire a discount card associated with the desired pizza entity. In cases that several organizations are affiliated with the particular discount card of interest to the user, the user may have an option to support a particular organization. That is, the user can select one of the selling organizations through which the discount card can be purchased.

In another example, a user may input or select a particular pizza vendor to view discount cards associated with that particular vendor. For example, assume a user is particularly interested in a discount card having offers from "Pizza X." In such a case, the user can input or select "Pizza X" and be presented with a Pizza X discount card to view and/or activate. In cases that several organizations are sellers of the "Pizza X" discount card, the user may have an option to support a particular organization.

In addition or alternatively to searching for discount cards using an indication of the vendor(s) associated with a card or the organization selling discount cards, a user may be able to search for discount cards in other manners. For example, in some implementations, a user may be able to search for discount cards based on the physical location of the user device and/or the vendor location(s). That is, a user can elect to view or search for discount cards available in a particular geographical location (e.g., a state, a city, a country, a neighborhood, etc.). In another example, a user can elect to view or search for discount cards available in the area the user device 102 identifies as its current location (e.g., using GPS or cellular capabilities).

A search can be performed to identify potential electronic discount cards in accordance with one or more criteria entered or input by a user. In some embodiments, the search for potential discount cards is carried out by the vendor offer application 108. In other embodiments, the search for potential discount cards is carried out by the vendor offer manager 104. In this way, the vendor offer application 108 can communicate the user-selected criteria to the vendor offer manager 104 to carry out the search for potential electronic discount cards that correspond with the intent of the user and, thereafter, provide such results to the user device 102.

Upon identifying electronic discount cards of potential interest to the user, for example based on search criteria, the discount-card activating component 112 can present indications of such identified discount cards. As can be appreciated, any number or manner of details can be provided to the user to describe potential electronic discount cards that might be of interest to the user. For instance, the potential vendors as well as other details associated with the vendor can be provided. By way of example, a vendor location (e.g., city), a value of the discount card, a value of the cost of the discount card, the organization(s) selling the card, etc. may be provided to the user to enable a user to decide whether to purchase the discount card.

Additionally, a user can be provided with an option to view details of a discount card. In this regard, a user may select to view details associated with a discount card such that the user can decide whether to purchase the fundraising card. Details may include, for instance, participating vendor locations, vendor contact information, the vendor's identification number, data pertaining to the selling organization, offer details (e.g., amount of each offer or coupon, etc.), terms and conditions for the discount card, etc.

A user can select to activate a particular discount card. In some implementations, upon such a selection, the selected electronic discount card is available to the user to redeem offers at the participating vendor. In other implementations, to activate a discount card, the card must be purchased. In such cases in which a card purchase is required to activate the discount card, the discount-card activating component 112 can be configured to facilitate payment of the selected discount card. Purchase of a discount card may be made in any manner. In some embodiments, a user may input or select a user payment account for purchasing the discount card. In such cases, payment for the discount card is deducted from the user's payment account (e.g., an account associated with the vendor offer application 108, a third-party account accessible by the vendor offer application 108, etc.). In other embodiments, a user may be prompted to input credit card information or another form of payment to purchase the discount card. Embodiments described herein are not intended to limit the scope of opportunities for facilitating payment for discount cards.

Upon activating a discount card (e.g., by selecting the discount card and/or purchasing the discount card), the activated discount card is made available to the user such that the user can utilize the electronic discount card at the participating vendor. In some cases, the electronic discount card, or data associated therewith (e.g., identification of activated card, time and date of card activation, etc.), is stored on the user device 102. In other cases, the electronic discount card, or data associated therewith, is stored at the vendor offer manager 104. Notwithstanding the location at which the electronic discount card, or data associated therewith, is stored, the electronic discount card can be subsequently accessed via the user device 102 to use one or more offers provided by the electronic discount card at a corresponding participating vendor.

The discount-card managing component 114 is configured to facilitate utilization of an electronic discount card(s). Initially, an indication may be provided that a user would like to view and/or utilize a previously activated discount card. In some cases, to specify a particular discount card to utilize, a user may select to use the discount cards feature 110 resulting in a list of activated discount cards being provided. Such a listing of discount cards may be activated discount cards that have been purchased by the user but that have not expired. The activated discount card(s) can be presented along with an option to search for additional discount cards to view and/or acquire.

As can be appreciated, a list of activated discount cards can be presented in any manner. In embodiments, activated discount cards are listed alphabetically, in order of expiration date, in order of purchase date, in order of most frequently used, in order of vendor location relative to the user, in accordance with a search for an activated discount card or group of discount cards, etc. For each listed discount card, any amount of information can also be provided. For example, an identification of the discount card (e.g., vendor name) may be presented along with a corresponding expiration date, a percent or proportion of utilization of the discount card, an indication of more details, and/or the like.

Upon selection of an indication to use and/or view a particular discount card, the discount-card managing component 114 facilitates providing the electronic discount card, or a portion thereof. As the electronic discount card, or data associated therewith, can be stored at the user device 102 and/or the vendor offer manager 104, such data can be retrieved or received from the appropriate location and thereafter provided for display via the user device 102.

The selected electronic discount card can be displayed in any manner. For instance, an electronic discount card might resemble a physical discount card in that it might have a front face and a rear face of the card. The front face may include, or have links to, general details of the discount card, such as an identification of the discount card, contact information associated with the discount card, terms and conditions associated with the discount card, expiration of the discount card, etc. The rear face of the discount card may include, or have links to, details related to various offers provided by the discount card. An electronic discount card resembling a physical discount card, however, is not intended to limit the scope of embodiments of the present invention.

Further, an electronic discount card can, in some embodiments, be customizable to the vendor. That is, a first discount card might include a first number of offers and a second discount card might include a second number of offers. As can be appreciated, in some embodiments, vendor customizations may be input and/or managed by a representative of the vendor offer application 108 (e.g., to the discount cards service 130). In other embodiments, vendor customizations may be input and/or managed by a representative of the vendor. In such an embodiment, a vendor may be able to provide customization options to the vendor offer manager 104, such as the discount cards service 130, such that the vendor offer manager 104 can generate the discount card based on the customizations provided by the vendor. A vendor may provide customization options in any manner, such as, for instance, by accessing a web page via a web browser. The vendor representative can input or select customization options through the web page and provide such customizations to the vendor offer manager 104.

In addition to displaying a selected discount card, the discount-card managing component 114 is configured to facilitate redeeming an offer associated with a discount card. That is, a user can select a particular offer from the selected discount card that he or she would like to redeem. Upon selecting an offer for redemption, the offer can be removed from the discount card or otherwise indicated as unavailable (e.g., presented as faded, presented with a different format, presented in a different color, presented with an overlay or icon over the offer, etc.) such that the user cannot subsequently utilize the offer.

Using or redeeming an offer can include alternative or additional implementations. For instance, in some cases, a user or a vendor representative may be required to confirm the utilization of the offer. In this regard, the user or vender representative may select a confirmation icon and/or enter an authentication code to confirm redemption of an offer.

Utilization or redemption of an offer is captured such that the user cannot subsequently use the same offer. In this way, transaction data related to redemption of the offer can be saved, for example, at the user device 102 or remote from the user device 102 (e.g., such as the vendor offer manager 104). By way of example, and not limitation, transaction data related to redemption of the offer may be a time and/or date associated with the offer, an identification of the offer, the user utilizing the offer, the vendor associated with the offer, etc. Captured data associated with use of an offer can be used, for example, to provide a modified discount card accurately reflecting the unavailability of the redeemed offer, to determine when to provide an indication of discount card completion to the user, to determine whether to provide an electronic coupon to the user, as described in more detail in relation to the couponing feature, or the like.

As can be appreciated, many different embodiments can be utilized to facilitate management of electronic discount cards. FIGS. 2-17 provide an example of one implementation that can be employed by a vendor offer application, such as the vendor offer application 108, to enable a user to obtain and utilize electronic discount cards. FIGS. 2-16 are provided merely for exemplary purposes and are not intended to limit the scope of embodiments of the invention.

Initially, after opening the vender offer application 108, a user may select an indication to use the discount cards feature 110, particularly when multiple features (e.g., loyalty card feature, electronic coupon feature, etc.) are offered or provided. For example, and with reference to FIG. 2, the user may select the My Cards 202 icon to initiate interaction with the discount cards feature 110 of FIG. 1. As described in more detail below, the user can also be presented with options to interact with other features, such as the loyalty cards feature and the electronic coupons feature.

Figures 2, 3, 4:
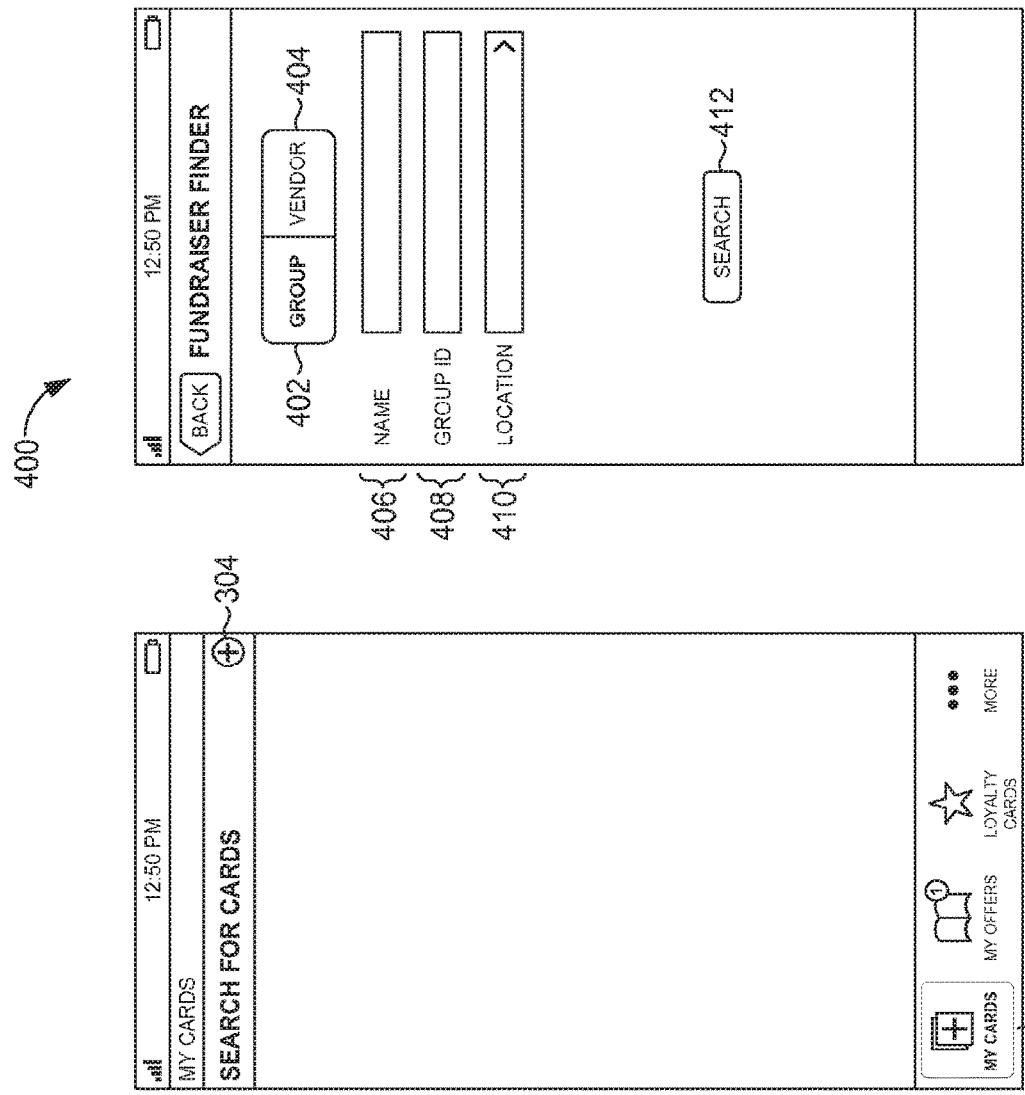
FIG. 2 is a drawing illustrating a graphical user interface for selecting a discount cards feature, in accordance with an embodiment of the present invention.
FIG. 3 is a drawing illustrating a graphical user interface for selecting to search for discount cards, in accordance with an embodiment of the present invention.
FIG. 4 is a drawing of a user interface for searching for a discount card(s) using a group search, in accordance with an embodiment of the present invention.

After selecting the My Cards 202 icon, the user is presented with an option to search for discount cards (e.g., by groups or by vendors), as shown in FIG. 3. The emphasis placed on the My Cards 302 icon indicates that the user is utilizing the discount cards feature. As illustrated in FIG. 3, the user has an opportunity to search for available discount cards. To initiate a search for discount cards, the user can select a search indication, such as search indication 304 to initiate a search for available discount cards.

Assume the user selects to search for discount cards by selecting search indication 304 in FIG. 3. Upon such a selection, a search user interface 400 of FIG. 4 can be presented. The search user interface 400 of FIG. 4 provides a user an opportunity to search for discount cards using either a group search 402 or a vendor search 404. As shown, when the group search 402 is selected, the user is able to search for discount cards associated with a particular group or organization selling discount cards. As such, the user can elect to provide or input a name 406 or subject matter associated with the group. For instance, the user may enter YMCA to view various YMCA affiliations. Alternatively, the user may enter a specific group associated with the YMCA, for example, "YMCA Olathe" to identify discount cards associated with the organization of YMCA Olathe. Alternatively or additionally, a user can enter a particular group ID 408 associated with a particular organization. In this regard, YMCA Olathe can be associated with a group ID to provide to potential discount card buyers.

Additionally or alternatively, a user might provide a location 410. Such an indication of a location might be provided by a geographical area to which organizations are associated and/or discount cards are associated. For instance, a user might input a state and/or city to identify potential discount cards associated with that particular state and/or city. In other embodiments, the location 410 may be automatically derived based on a GPS or cellular identified location of the user device being used by the user. In this regard, a user may provide an indication to utilize the current location, and a search may be performed using the GPS or cellular identified location. To initiate a search, a user may select the search button 412. A search can then be performed to identify discount cards that meet criteria provided in association with a name 406, a group ID 408, and/or a location 410. By way of example, assume that a user enters "YMCA" as the name 406. In such a case, and as illustrated in 502 of FIG. 5, discount cards associated with YMCA organizations are provided to the user. The user can then select a desired YMCA group to view discount cards associated with the selected group.

Figures 5, 6, 7:
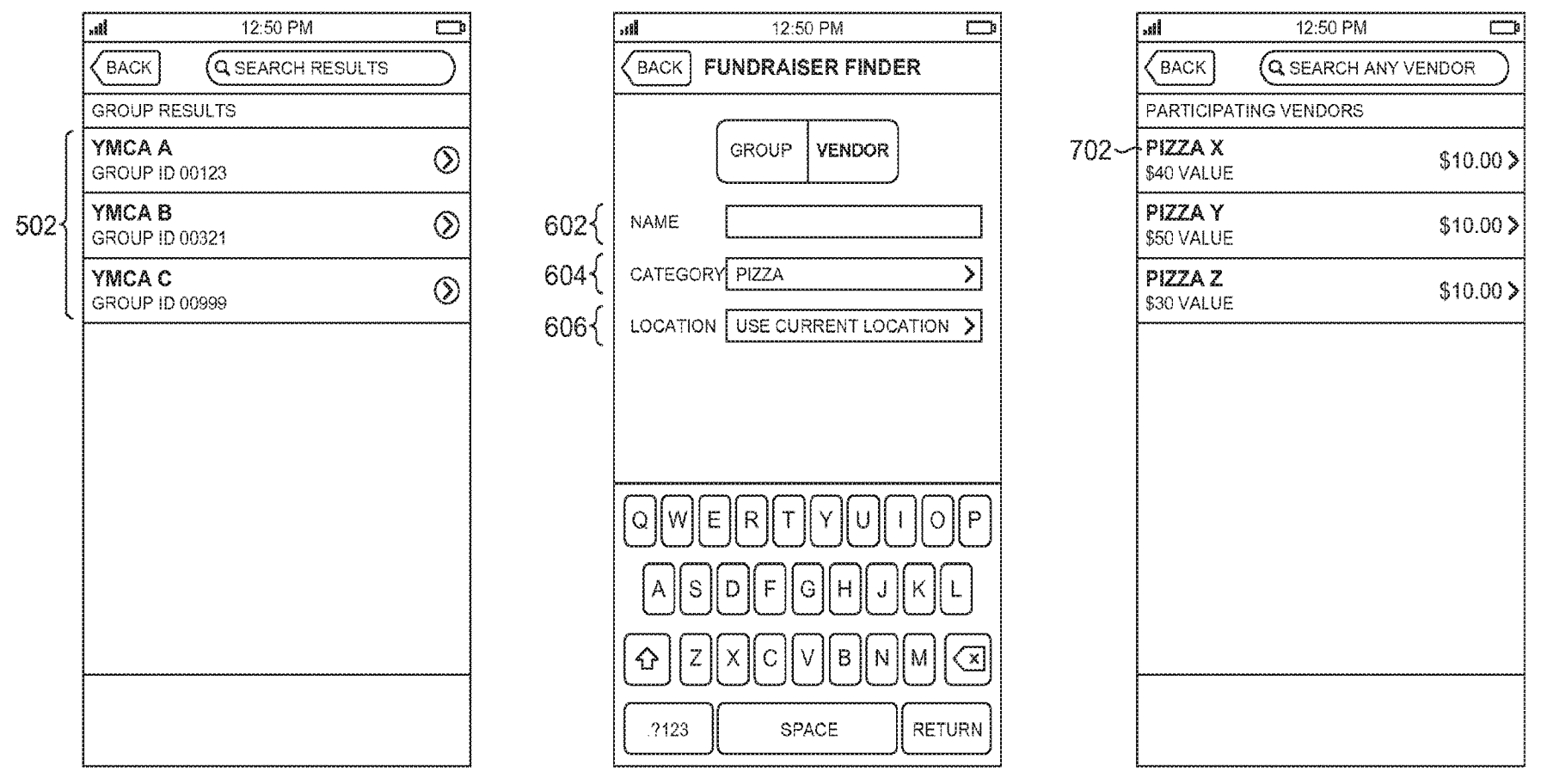

FIG. 6 illustrates an example of a user searching for a discount card(s) using a vendor search. In this regard, the user is able to search for discount cards by inputting an indication of a vendor. This may occur, for example, in instances that the user is not affiliated or searching for a particular organization to support but rather is interested in a discount card provided by a particular vendor. In other instances, a user may be unable to recall the organization of interest to support and, as such, may search for that organization based on vendor. A user may input a name, or a portion thereof, or a desired vendor at name 602, a vendor category 604, and/or a location 606. For example, assume a user is searching for a discount card associated with "Pizza X." In such a case, the user might enter "Pizza X" into vendor name 602, "pizza" into vendor category 604, and/or a particular location into location 606. Such a location may indicate a particular geographical area (e.g., state, city, etc.) or may indicate to use the current GPS or cellular identified location of the user device.

For purposes of illustration, assume that a user inputs "pizza" into vendor category 604 and selects to search for corresponding vendors. In FIG. 7, various pizza vendors are presented based on their relationship or association to the "pizza" category. The user can also be presented with various details regarding the different pizza discount cards. For example, Pizza X has a discount card of a $40.00 value for a cost of $10.00, and Pizza Y has a discount card valued at $50.00 for a cost of $10.00.

Figure 8:
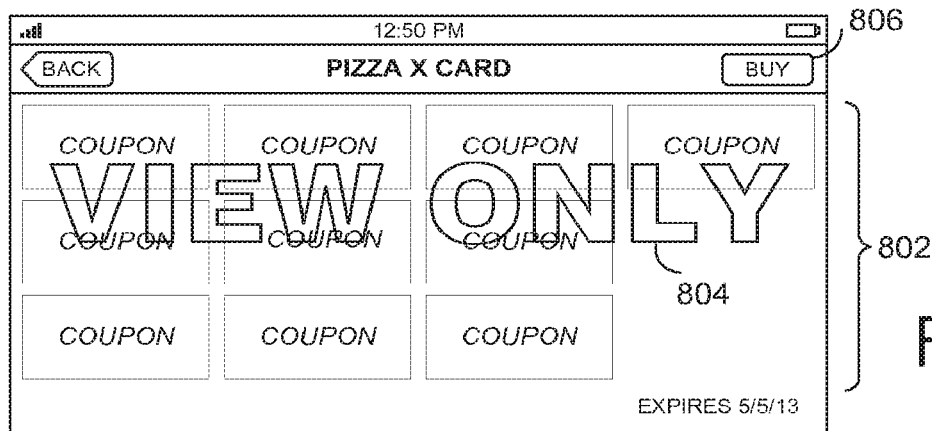
FIG. 8 is a drawing illustrating a user interface allowing a user to view a discount card, in accordance with an embodiment of the present invention.
Figure 9:
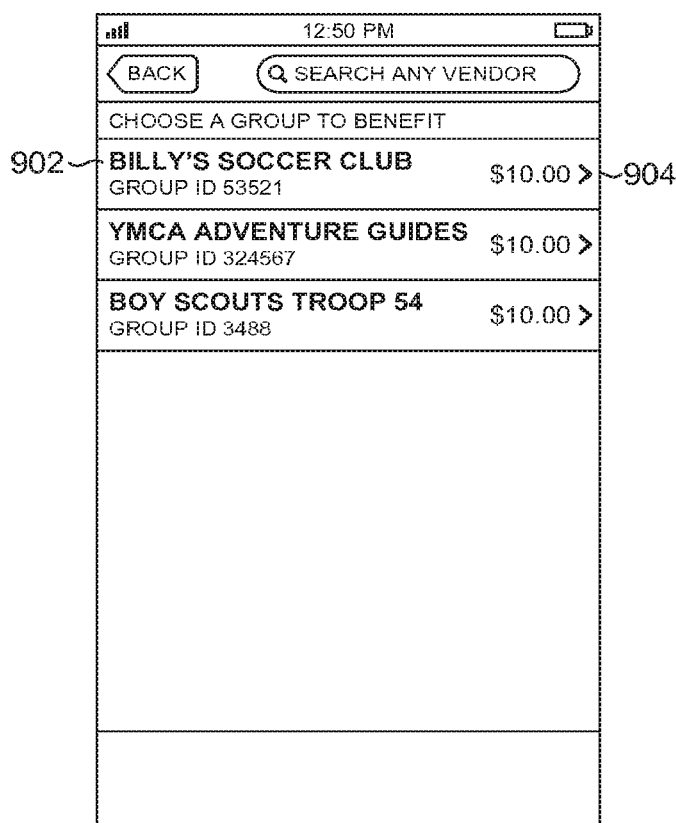
FIG. 9 is a drawing illustrating a user interface allowing a user to select a group to benefit from purchase of a discount card, in accordance with an embodiment of the present invention.

The user can then select to view and/or purchase a discount card in any manner. In one example, assume the user selects a desired discount card, such as Pizza X discount card 702 of FIG. 7. Upon selecting an indication of the Pizza X discount card 702 of FIG. 7, the user is presented with details of the Pizza X discount card. As can be appreciated, any number and manner of discount card details can be provided. In one embodiment, a user is able to view an inactive (for viewing only) card. Such a card may have a front face that indicates the details of the card (e.g., vendor name, vendor contact information, vendor locations, vendor locations relative to user location, etc.). The card may also have a rear face that indicates the specific offers available if the card is purchased. For example, as illustrated in FIG. 8, the card may provide the available offers 802 with an indication 804 that the discount card is for viewing purposes only.

Figure 10:
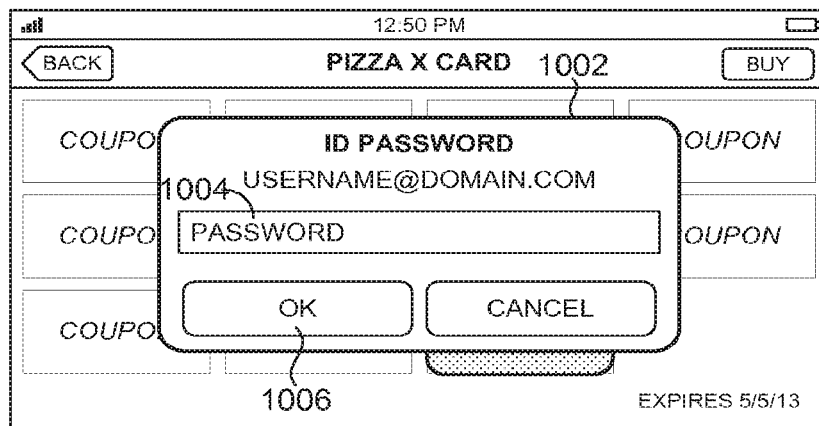
FIG. 10 is a drawing illustrating a user interface allowing a user to purchase a discount card, in accordance with an embodiment of the present invention.

In association with viewing the card, the user may have an opportunity to purchase the card. That is, a user may select the buy icon 806 of FIG. 8 to initiate purchase of the Pizza X discount card. Assume the user selects the buy icon 806 of FIG. 8 to purchase the discount card. When the discount card is associated with multiple selling organizations or groups, the user can be presented with a list of available groups or organizations from which the user can select to apply any benefits. For example, and with reference to FIG. 9, a list of groups that can benefit from the purchase of the discount card are provided. As such, sales proceeds (e.g., a percent of the discount card cost) associated with the discount card can be provided to the selected group or organization. In this regard, a user can select an organization, such as "Billy's Soccer Club" 902 to benefit from the purchase of the discount card. Upon selecting the group, for example by selection 904, the user is presented with an option 1002 for purchasing the card, as illustrated in FIG. 10. In FIG. 10, a user is able to provide a user identifier and/or password 1004 to initiate the purchase. In this regard, the purchase is made by withdrawing the purchase price (e.g., $10.00) from the designated account (e.g., an account established with the card application or an account established with a third party). In other embodiments, a user may be prompted to select an option to provide payment in another manner, such as by way of a credit card or PayPal™.

Upon selecting OK icon 1006 in FIG. 10, the selected discount card is activated such that the user can utilize the discount card at the appropriate vendor. In this regard, the electronic discount card may be obtained and saved at the user device, such as user device 102 of FIG. 1, or may be stored for access at a vendor offer manager, such as the vendor offer manager 104 of FIG. 1.

Figure 11:
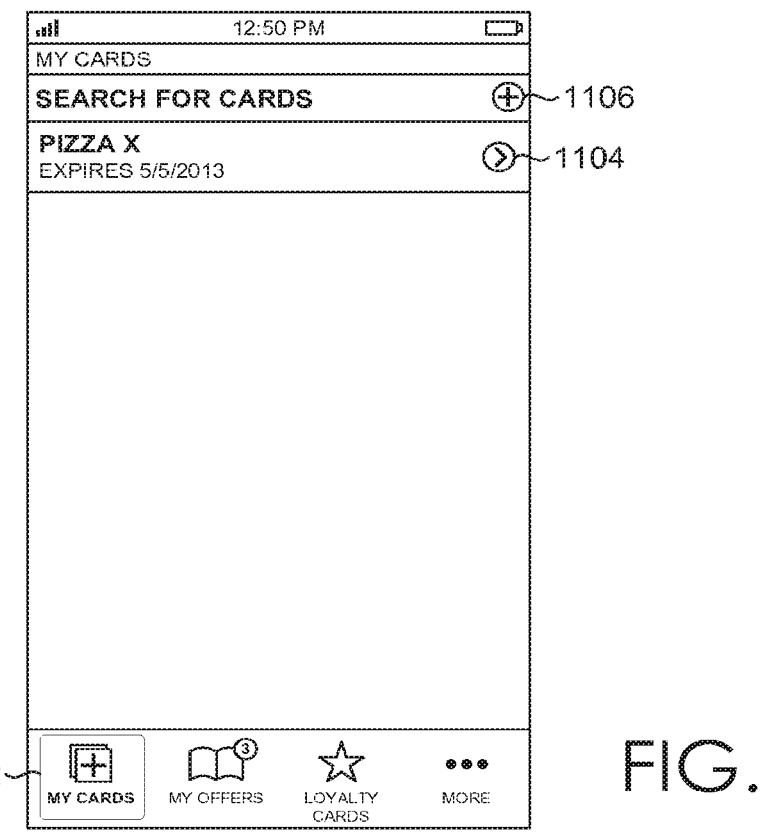
FIG. 11 is a drawing illustrating a user interface for presenting an indication of an activated discount card, in accordance with an embodiment of the present invention.

As illustrated in FIG. 11, the activated Pizza X discount card is now listed as an available discount card. In this regard, when the user selects to visit the My Cards feature 1102, the user can view and/or use the Pizza X discount card 1104 or elect to search for another discount card 1106. In some cases, all activated discount cards are automatically presented. In other cases, activated discount cards may be presented upon an occurrence of an event (e.g., an applicable search or indication of a specific discount card(s) to be presented).

Figure 12:
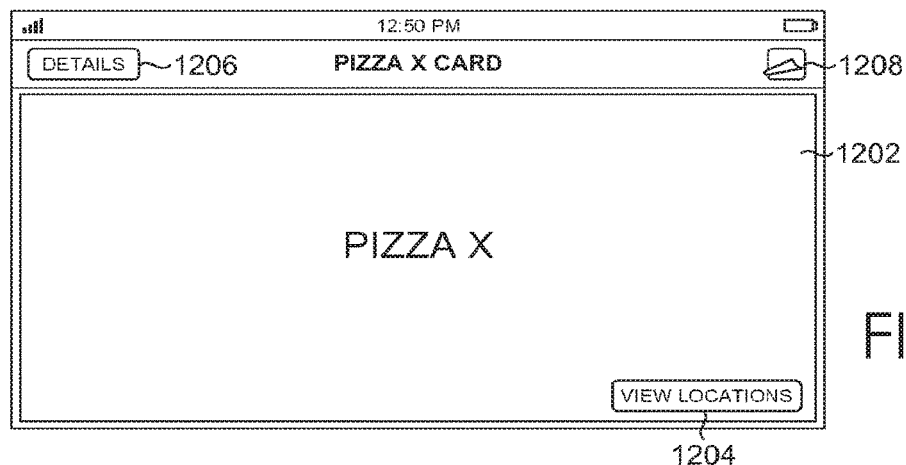
FIG. 12 is a drawing illustrating a user interface for presenting a front face of an activated discount card, in accordance with an embodiment of the present invention.
Figure 13:
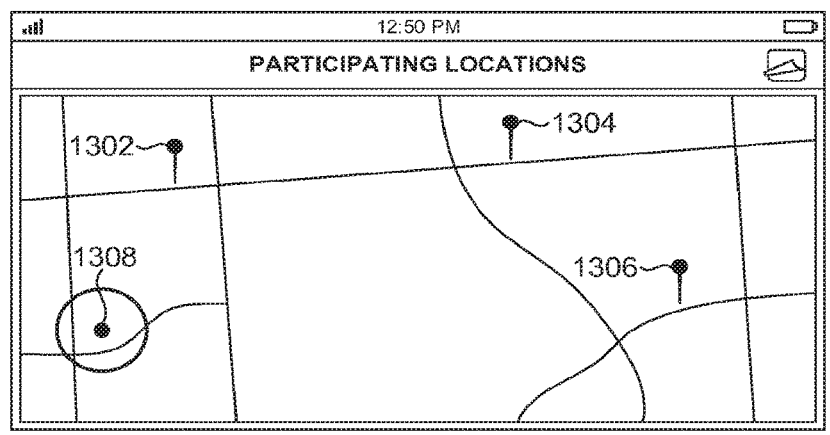
FIG. 13 is a drawing illustrating a user interface for presenting participating locations associated with a discount card, in accordance with an embodiment of the present invention.

Assume now that the user selects to view and/or use the Pizza X discount card by selecting Pizza X 1104 of FIG. 11. Based on the selection to view and/or use the Pizza X discount card, the Pizza X discount card is presented. For instance, as illustrated in FIG. 12, the front face of the Pizza X discount card can be provided. The front face of the Pizza X discount card may provide any number of details. The front face 1202 shown in FIG. 12 provides the user an ability to view vendor locations 1204. Such locations may indicate participating vendor locations and, in some cases, the location of the user. By way of example only, assume the user selects the view locations icon 1204. In such a case, the user can view various participating locations associated with Pizza X, such as a first location 1302, a second location 1304, and a third location 1306 in FIG. 13, as well as the user's own location 1308.

Returning to FIG. 12, the user can also select a view details icon 1206 to view details associated with the Pizza X card. Such details may include available offers, contact information associated with the vendor, terms and conditions associated with the card, etc.

The user may also elect to rotate the discount card to view the rear face of the discount card having available offers. Such an election to view the rear face of the discount card can be provided by selecting an electronic rotate icon, such as rotate icon 1208 of FIG. 12.

Figure 14:
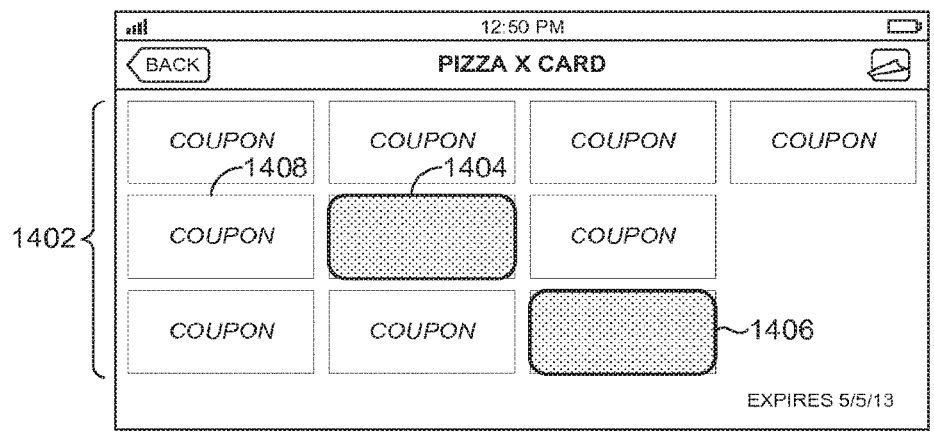
FIG. 14 is a drawing illustrating a user interface for presenting a rear face of an activated discount card, in accordance with an embodiment of the present invention.

For purposes of illustration, assume now that the user selects to view the available offers by selecting the rotate icon 1208. In such a case, available offers 1402 are provided via the rear face of the electronic discount card. As illustrated in FIG. 14, the presented offers may include available and unavailable offers. Unavailable offers, such as offers previously used by the user, can be indicated as such (e.g., including a "stamp," a faded offer, or other demarcation or representation indicating that the offer is unavailable), as illustrated by offers 1404 and 1406. The user can select to utilize an available offer, for example, by selecting a particular offer (e.g., via a selector or a touch screen).

Figure 15:
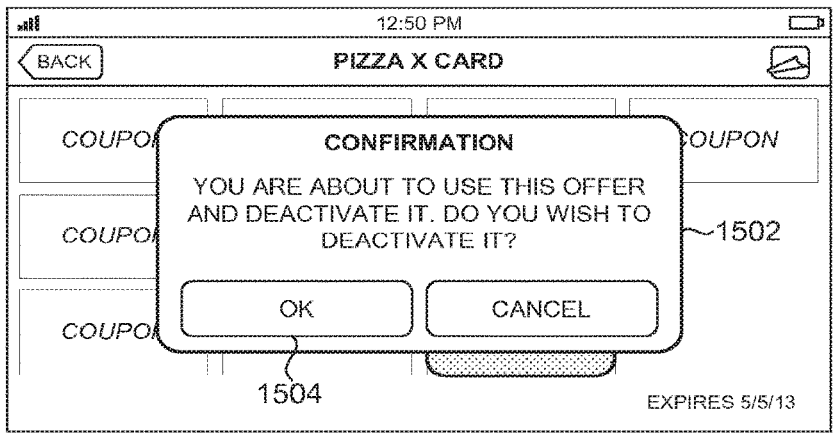
FIG. 15 is a drawing illustrating a user interface allowing a user to confirm utilization of an offer, in accordance with an embodiment of the present invention.
Figure 16:
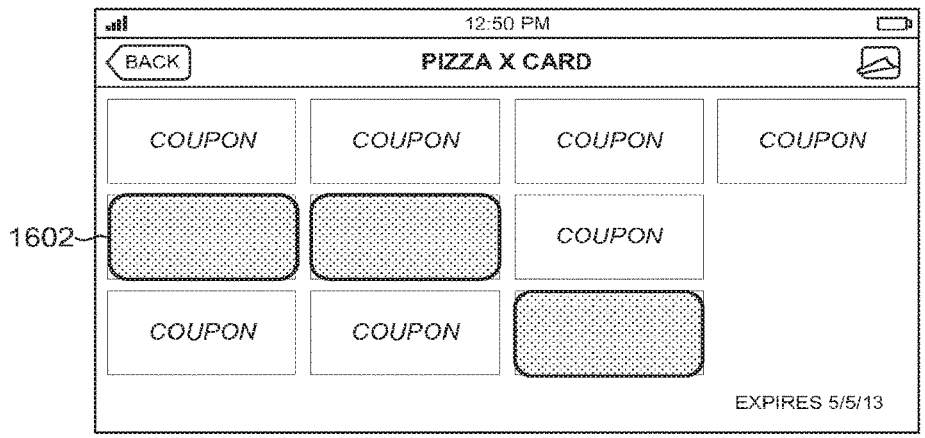
FIG. 16 is a drawing illustrating a user interface of a discount card presenting a recently fulfilled offer, in accordance with an embodiment of the present invention.
Figure 17:
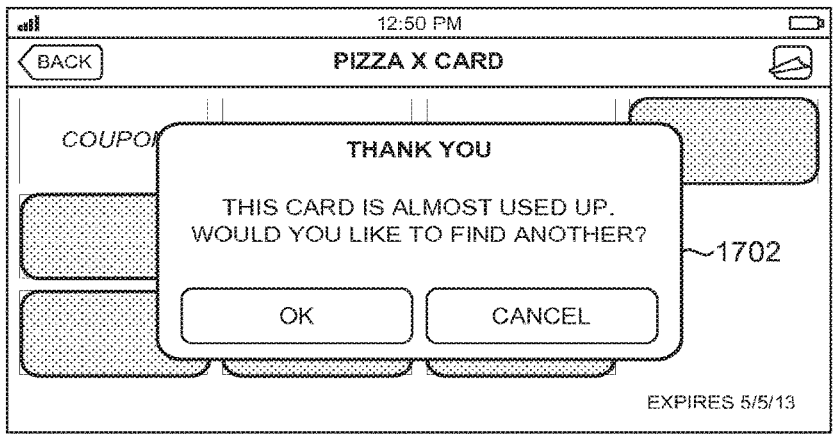
FIG. 17 is a drawing illustrating a user interface for presenting an indication that a discount card has been fulfilled to an extent, in accordance with an embodiment of the present invention.
Figure 21:
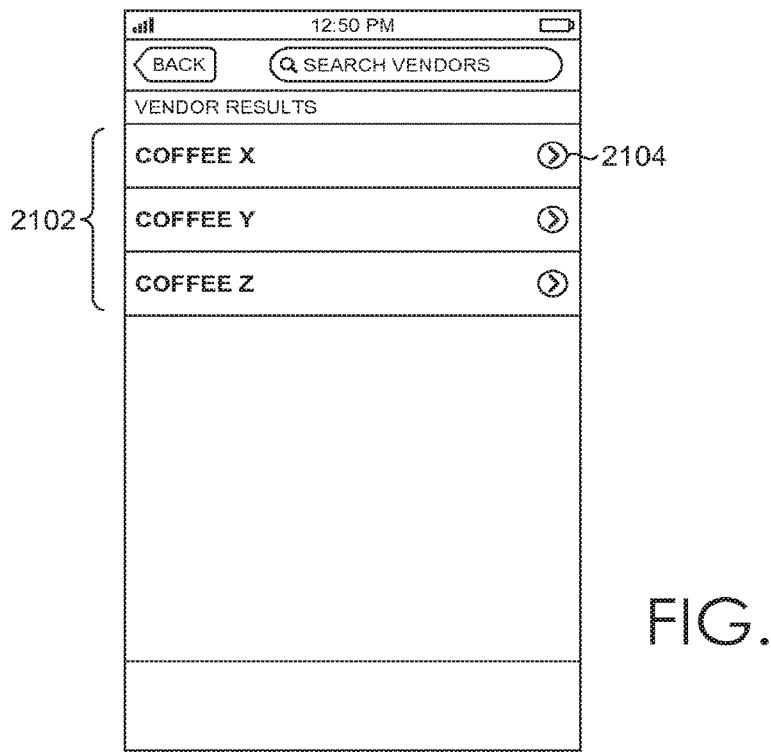
FIG. 21 is a drawing illustrating a user interface for providing vendor search results, in accordance with an embodiment of the present invention.

Assume now that the user selects available offer 1408 of FIG. 14 to use the corresponding coupon. Upon selecting to utilize offer 1408, a confirmation to use the offer can be performed. In some cases, as illustrated in FIG. 15, a confirmation notice 1502 indicating that the offer is about to be deactivated (i.e., unavailable) and requesting confirmation can be provided. Upon confirming the deactivation, such as by selection of the OK icon 1504, the offer is indicated as deactivated, as illustrated in FIG. 16 as a deactivated offer 1602. Other methods can be used to deactivate an offer, and those provided herein are not intended to limit the scope of embodiments of the invention. For instance, a vendor representative (e.g., an employee of the vendor) could provide an authentication code that deactivates the offer.

Now assume that the user has used a particular percent or proportion of the available offers. For instance, assume that a user has utilized more than a predetermined percent (e.g., 70%) of the available offers. In some embodiments, the user can be provided with a completion indication to alert the user so that the user can purchase another discount card. For instance, offer completion notice 1702 can be provided to the user to notify the user of near completion of the offers associated with the particular discount card.

Electronic Loyalty Cards

An electronic loyalty card refers to an electronic card that is used to facilitate tracking loyalty of a consumer for a particular entity. Generally, a loyalty card is specific to a particular vendor to track a consumer's interactions or transactions with the vendor. For example, a loyalty card might track a number of visits the consumer has made to the vendor, an amount of money the consumer has paid to the vendor, a number of purchases made by the consumer, a number of events attended (e.g., vendor-hosted events), or the like. With a loyalty card, a user can be provided with an offer from the vendor upon attaining a particular target or goal, for example, associated with a number of visits made to the vendor, a number of purchases made by the consumer, an amount of money spent by the consumer, etc.

Returning to FIG. 1, the loyalty cards feature 116 includes a loyalty-card activating component 118 and a loyalty-card managing component 120. In some embodiments, one or more of the illustrated components may be implemented as stand-alone applications. In other embodiments, one or more of the illustrated components may be integrated directly into the operating system of the user device 102 or other computing device, such as vendor offer manager 104. It will be understood by those of ordinary skill in the art that the components illustrated in FIG. 1 are exemplary in nature and in number and should not be construed as limiting. Any number of components may be employed to achieve the desired functionality within the scope of embodiments hereof. Further, components may be located on any number of servers or computers.

The loyalty cards feature 116 is configured to enable a user to activate and/or use one or more electronic loyalty cards via the user device 102. As such, a user can electronically use loyalty cards to track consumer loyalty and redeem offers provided upon reaching a target or goal pertaining to the vendor. As previously described, the loyalty cards feature 116 can be a stand-alone application, be part of the vendor offer application 108, or be provided via a website accessible via a web browser. In some embodiments, and as described in more detail below, the loyalty cards feature 116 might access loyalty cards service 132 of the vendor offer manager 104 to facilitate implementation of the loyalty cards feature 116.

The loyalty-card activating component 118 is configured to facilitate activating one or more loyalty cards. In this regard, the loyalty-card activating component 118 enables searching for desired loyalty cards and/or activating the loyalty cards.

Initially, the loyalty-card activating component 118 is configured to enable a user to search for a particular loyalty card(s). Such a search can be performed in any number of manners. In some cases, a user may search for a loyalty card based on a vendor identifier (e.g., vendor name, vendor numerical identifier, etc.) associated with the desired vendor or a category of desired vendors for which a loyalty card is desired. For instance, a user desiring a loyalty card for coffee may input or select a category of "coffee" as an indication to view loyalty cards associated with coffee vendors. In such an instance, any loyalty cards associated with "coffee" are presented to the user. The user can then view and/or acquire a loyalty card associated with the desired coffee entity. In cases where several vendors are affiliated with the particular category of loyalty cards, the user may have an option to select a particular vendor. That is, the user can select one of the participating vendors to acquire a loyalty card associated with the desired vendor.

In another example, a user may input or select a particular school or non-profit organization to view loyalty cards associated with that particular vendor. For example, assume a user is particularly interested in a loyalty card from "School X." In such a case, the user can input or select "School X" and be presented with a School X loyalty card to view and/or activate.

In addition or alternatively to searching for loyalty cards using an indication of the vendor(s) associated with the card, a user might be able to search for loyalty cards in other manners. For example, in some implementations, a user may be able to search for loyalty cards based on the physical location of the user and/or the vendor location(s). That is, a user can elect to view or search for loyalty cards available in a particular geographical location (e.g., a state, a city, a country, a neighborhood, etc.). In another example, a user can elect to view or search for loyalty cards available in the area the user device 102 identifies as its current location (e.g., using GPS or cellular capabilities).

A search can be performed to identify potential electronic loyalty cards in accordance with one or more criteria entered or input by a user. In some embodiments, the search for potential loyalty cards is carried out by the vendor offer application 108. In other embodiments, the search for potential loyalty cards is carried out by the vendor offer manager 104. In this way, the vendor offer application 108 can communicate the user-selected criteria to the vendor offer manager 104 to carry out the search for potential electronic loyalty cards that correspond with the intent of the user and, thereafter, provide such results to the user device 102.

Upon identifying electronic loyalty cards of potential interest to the user, for example based on search criteria, the loyalty-card activating component 118 can present indications of such identified discount cards. As can be appreciated, any number or manner of details can be provided to the user to describe potential electronic loyalty cards that might be of interest to the user. For instance, the potential vendors as well as other details associated with the vendor that may be of interest to the user can be provided. For instance, a vendor location (e.g., city), an offer provided in association with the loyalty card, etc. may be provided to the user to enable a user to decide whether to obtain the loyalty card.

Additionally, the loyalty-card activating component 118 can provide a user with an option to view details associated with a loyalty card. In this regard, a user may select to view details associated with a loyalty card such that the user can decide whether to obtain the loyalty card. Details may include, for instance, participating vendor locations, vendor contact information, offer details (e.g., amount of each offer associated with the loyalty card, etc.), terms and conditions for the loyalty card, etc.

In some embodiments, a user can select to activate a particular loyalty card by simply selecting the loyalty card. Upon such a selection, the electronic loyalty card is available for tracking consumer loyalty and/or redeeming offers at the participating vendor. In some cases, to activate a loyalty card, information specific to the user (e.g., name, address, phone number, e-mail address, etc.) must be provided. In other cases, the card may need to be purchased to be activated. In such cases in which a card purchase is required to activate the loyalty card, the loyalty-card activating component 112 can be configured to facilitate payment of the selected loyalty card. Purchase of a loyalty card may be made in any manner. In some embodiments, a user may input or select a user payment account for purchasing the loyalty card. In such cases, payment for the loyalty card is deducted from the user's payment account (e.g., an account associated with the vendor offer application, a third-party account accessible by the vendor offer application, etc.). In other embodiments, a user may be prompted to input a credit card number or other form of payment to purchase the loyalty card. Embodiments described herein are not intended to limit the scope of opportunities for facilitating payment for or activation of loyalty cards.

Upon activating a loyalty card (e.g., by selecting the loyalty card and/or purchasing the loyalty card), the activated loyalty card is made available to the user such that the user can utilize the electronic loyalty card at the participating vendor. In some cases, the electronic loyalty card, or data associated therewith, is stored on the user device 102. In other cases, the electronic loyalty card, or data associated therewith, is stored at the vendor offer manager 104. Notwithstanding the location at which the electronic loyalty card, or data associated therewith, is stored, the electronic loyalty card can be subsequently accessed via the user device 102 for use at a corresponding participating vendor.

The loyalty-card managing component 120 is configured to facilitate utilization of a loyalty card(s). Initially, an indication may be provided that a user would like to view and/or utilize a previously activated loyalty card. In some cases, to specify a particular loyalty card to utilize, a user may select to use the loyalty cards feature 116 resulting in a list of activated loyalty cards being provided. Such a listing of loyalty cards may be activated loyalty cards that have been activated by the user but that have not expired. The activated loyalty cards can be presented along with an option to search for additional loyalty cards to view and/or acquire.

As can be appreciated, the list of loyalty cards can be presented in any manner. In embodiments, the activated loyalty cards are listed alphabetically, in order of expiration date, in order of activation date, in order of most frequently used, in order of vendor location relative to the user, in accordance with a search for an activated loyalty card or group of loyalty cards, etc. For each listed loyalty card, any amount of information can also be provided. For example, an identification of the loyalty card (e.g., vendor name) may be presented along with a corresponding expiration date, a percent or proportion of utilization of the loyalty card, an indication of more details, and/or the like.

Upon selection of an indication to use and/or view a particular loyalty card, the loyalty-card managing component 120 facilitates providing the electronic loyalty card, or a portion thereof. As the loyalty card, or data associated therewith, can be stored at the user device 102 and/or the vendor offer manager 104, such data can be retrieved or received from the appropriate location and thereafter provided for display via the user device 102.

The selected electronic loyalty card can be displayed in any manner. For instance, an electronic loyalty card might resemble a physical loyalty card in that it might have a front face and a rear face of the card. The front face may include, or have links to, general details of the loyalty card, such as an identification of the loyalty card, contact information associated with the loyalty card, terms and conditions associated with the loyalty card, expiration of the loyalty card, etc.

The rear face of the loyalty card may include, or have links to, details related to an offer(s) provided by the loyalty card and/or usage or tracking of loyalty, such as participation or consumer transactions (e.g., products and/or services purchased, received, or obtained from the vendor). As previously described, a loyalty card can be used to track user consumption of products and/or services provided by a vendor or user participation of events, for instance, hosted by the vendor, in any manner. In some cases, a loyalty card captures transactions by capturing a number of instances a particular product or service is purchased at the vendor, a number of instances any of a set of products or services is purchased at the vendor, a number of instances a vendor is visited, an amount of money spent at the vendor for a product(s) or service(s), a number of instances a certain amount of money is spent at the vendor, a number of instances an entity event is attended or any other manner of tracking loyalty of a customer to the vendor.

Generally, with loyalty cards, upon achieving a loyalty target or goal (e.g., a particular number of purchases or attendances or an amount of purchases), the user is rewarded with an offer, such as a discount or points (e.g., a free drink, a free meal, a free admission to an event, etc.). Accordingly, a loyalty card can set out loyalty portions that need to be attained and, in some cases, the offer to be received upon fulfilling the transaction portions. Loyalty portions may be transactions portions to track transactions in association with a vendor or participation portions to track participation, attendance, or interactions in association with a vendor. Loyalty portions can be any designations that indicates the various transactions or participations required to be completed to attain a particular offer. An electronic loyalty card resembling a physical loyalty card, however, is not intended to limit the scope of embodiments of the present invention.

A loyalty card tracking consumer transactions (e.g., quantity of purchases or amount of purchases) or participations (e.g., quantity of events attended or length of events attended) can, in some embodiments, be customizable to the vendor (e.g., transaction portions and/or offers). That is, a first loyalty card for a first vendor might require five purchases of a drink before providing a reward, while a second loyalty card for a second vendor might require ten purchases of a drink before providing a reward. In another embodiment, a first loyalty card for a first vendor might require ten purchases in a first amount while a second loyalty card for a second vendor might require ten purchases in a second amount. Further, the rewards might be for different items or for different amounts.

As can be appreciated, in some embodiments, vendor customizations may be input and/or managed by a representative of the vendor offer application 108 (e.g., to the loyalty cards service 132). In other embodiments, vendor customizations may be input and/or managed by a representative of the vendor. In such an embodiment, a vendor may be able to provide customization options to the vendor offer manager 104, such as the loyalty cards service 132, such that the vendor offer manager 104 can generate the loyalty card based on the customizations provided by the vendor. A vendor may provide customization options in any manner, such as, for instance, by accessing a web page via a web browser. The vendor representative can input or select customization options through the web page and provide such customizations to the vendor offer manager 104.

In addition to displaying a selected loyalty card, the loyalty-card managing component 120 is configured to facilitate tracking loyalties (e.g., participations and transactions), such as purchases of vendor services and/or products, and, in some implementations, providing an offer associated with attaining a loyalty target. That is, the loyalty-card managing component 120 can track and monitor consumer transactions and/or participations relative to the vendor associated with the loyalty card. Tracking consumer transactions associated with products and/or services purchased from the vendor or participations in relation to the vendor can be performed in many different manners and may be carried out in accordance with customizations for the vendor.

In one embodiment, a transaction portion of the loyalty card corresponding with a consumed amount (e.g., a purchase amount or a number of purchases) can be indicated as such. In this regard, a loyalty card can indicate the portion of transactions that have been completed in relation to attaining the target. Similarly, a participation portion of the loyalty card corresponding with a participation amount (e.g., a number of events attended or a length of time of events attended) can be indicated as such. The loyalty card can indicate the portion of loyalties that have been completed relative to achieving a target goal. For example, an appropriate portion (e.g., number or amount) can be selected by the user or a vendor representative. That is, a user or vendor representative can select a transaction portion or participation portion of the loyalty card that he or she would like indicated as fulfilled or completed. Upon selecting an appropriate portion, the selected portion can be removed from the loyalty card or otherwise indicated as completed such that the user and/or vendor are apprised of progress to reaching a target. As can be appreciated, a loyalty card can have any level or amount of transaction portions or participation portions. In some cases, a loyalty card can have numerical loyalty portions that indicate a number of purchases made (e.g., for a particular product or service) or a number of events attended (e.g., for a particular organization). In other cases, a loyalty card can have numerical loyalty portions that indicate an amount of money spent for products and/or services. For example, in each instance where a user spends $10, a portion of the loyalty card can be deemed fulfilled.

Indication of loyalty via an electronic loyalty card can include alternative or additional implementations. For instance, in some cases, the user or vendor representative may be required to confirm the indication of loyalty. In this regard, a user or vender representative may select a confirmation button and/or enter an authentication code to confirm a transaction(s) or a participation(s).

Consumer transactions or participations can be captured such that the transactions or participations are tracked and/or monitored. As such, upon receiving a selection of a transaction or participation portion(s), such a selection can be captured and stored, for example at the vendor offer application 108 or the vendor offer manager 104. Tracking loyalty can enable determining to provide a modified loyalty card accurately reflecting the fulfillment of transactions or participations, when to provide an indication of loyalty card completion to the user, whether to provide a coupon or offer to the user, or the like.

When the user attains a target or goal of loyalties (e.g., transactions or participations), such as a number of purchases, an amount of purchases, a number of purchases exceeding a predetermined amount, a number of attended events related to the vendor, a number of attended events endorsed by the vendor, etc., the user can be presented with an offer or gift. As can be appreciated, an electronic offer can be for any number of items (e.g., a free item(s)), a discount of an item(s), a number of points that can be redeemed for an item(s), a free event admission, or the like. An offer provided based on attaining a target participation total or transaction total (e.g., number or amount) can be provided in a number of different ways. In one embodiment, the offer can be redeemed by providing the completed loyalty card to a vendor representative. That is, a user can show the completed loyalty card to a vendor representative to redeem the offer associated with completion of the loyalty card. In such an embodiment, the user or vendor representative may then indicate that the offer was redeemed and renew the loyalty card such that the loyalty card would not show any transactions or participations, and/or the like. In another embodiment, upon completing requisite transactions or participations, the corresponding offer can be automatically provided to the vendor offer application (e.g., to the electronic coupons feature).

Utilization or redemption of an offer is captured such that the user cannot subsequently use the same offer. In this way, data related to redemption of the offer can be saved, for example, at the user device 102 or remote from the user device 102 (e.g., in vendor offer manager 104).

As can be appreciated, many different embodiments can be utilized to facilitate management of electronic loyalty cards. FIGS. 18-29 provide an example of one implementation that can be employed by a vendor offer application, such as the vendor offer application 108, to enable a user to obtain and utilize electronic loyalty cards. FIGS. 18-29 are provided merely for exemplary purposes and are not intended to limit the scope of embodiments of the invention.

Initially, after opening the vender offer application 108, a user may select an indication to use the loyalty cards feature 116, particularly when multiple features (e.g., discount cards feature, electronic coupons feature, etc.) are offered or provided. For example, and with reference to FIG. 18, the user may select the Loyalty Cards icon 1802 to initiate interaction with the loyalty cards feature 116 of FIG. 1. As described in more detail herein, the user can also be presented with options to interact with other features, such as the discount cards feature and the electronic coupons feature.

After selecting the Loyalty Cards icon 1802, the user is presented with an option to search for loyalty cards (e.g., by vendors). The emphasis placed on the Loyalty Cards icon 1902 indicates that the user is utilizing the loyalty cards feature. As illustrated in FIG. 19, the user has an opportunity to search for available loyalty cards. To initiate a search for loyalty cards, the user can select a search indication, such as search indication 1904 to initiate a search for available loyalty cards.

Assume the user selects to search for loyalty cards by selecting search indication 1904 in FIG. 19. Upon such a selection, a search user interface 2000 of FIG. 20 can be presented. The search user interface 2000 of FIG. 20 provides a user an opportunity to search for loyalty cards using a vendor name 2002, a vendor category 2004, and/or a location 2006. As such, the user can elect to provide or input a name associated with the vendor. For instance, the user may enter Coffee X to locate loyalty cards associated with vendor Coffee X. Alternatively, the user may enter a category, for example, "coffee" to identify loyalty cards associated coffee vendors. Additionally or alternatively, a user might provide a location 2006. Such an indication of a location might be provided by a geographical area in which vendors and/or the users are located. For instance, a user might input a state and/or city to identify potential loyalty cards associated with that particular state and/or city. In other embodiments, a location may be automatically derived based on the GPS or cellular identified location of the user device being used by the user. In this regard, a user may provide an indication to utilize the current location, and a search may be performed using the GPS or cellular identified location. To initiate the search, a user can select the search button 2008. A search can then be performed to identify loyalty cards that meet the criteria provided in association with the name 2002, the category 2004, and/or the location 2006. By way of example, assume that a user enters "coffee" as the category 2004 and wishes to search using the current location of the user. In such a case, and as illustrated in 2102 of FIG. 21, loyalty cards associated with coffee in the vicinity of the current location of the user are provided.

The user can then select a desired coffee vendor to view and/or activate the corresponding loyalty card. In one example, the user selects an indication of a desired loyalty card, such as Coffee X loyalty card 2104 of FIG. 21. Upon selecting the indication of the Coffee X loyalty card 2104 of FIG. 21, the user is presented with details of the Coffee X loyalty card. As can be appreciated, any number and manner of loyalty card details can be provided. In one embodiment, a user is able to view an inactive (for viewing only) card. Such a card may have a front face that indicates the details of the card (e.g., vendor name, vendor contact information, vendor locations, vendor locations relative to user location, etc.). The card may also have a rear face that indicates the transactions required to obtain an offer. For example, as illustrated in FIG. 22, the card may provide the required transactions 2202 and the offer 2204 provided upon completing the required transactions with an indication 2206 that the card is for viewing purposes only.

In association with viewing the loyalty card, the user may have an opportunity to activate the card. That is, a user may select the keep icon 2208 of FIG. 22 to initiate activation of the Coffee X loyalty card. Although not illustrated, in some cases, activation of a loyalty card may require the user to provide user specific information and/or may require payment for such usage. In such cases where payment is required, upon selection of an activation icon, the user can be presented with an option for purchasing the loyalty card. For instance, a user might be able to provide a user identifier and password to initiate the purchase. In this regard, the purchase is made by withdrawing the purchase price from the designated account (e.g., an account established with the card application or an account established with a third party). In other embodiments, a user may be prompted to select an option to provide payment in another manner, such as by way of a credit card. Further, in activating a loyalty card, a user may be required to accept terms and conditions associated with such a loyalty card.

Figure 22:
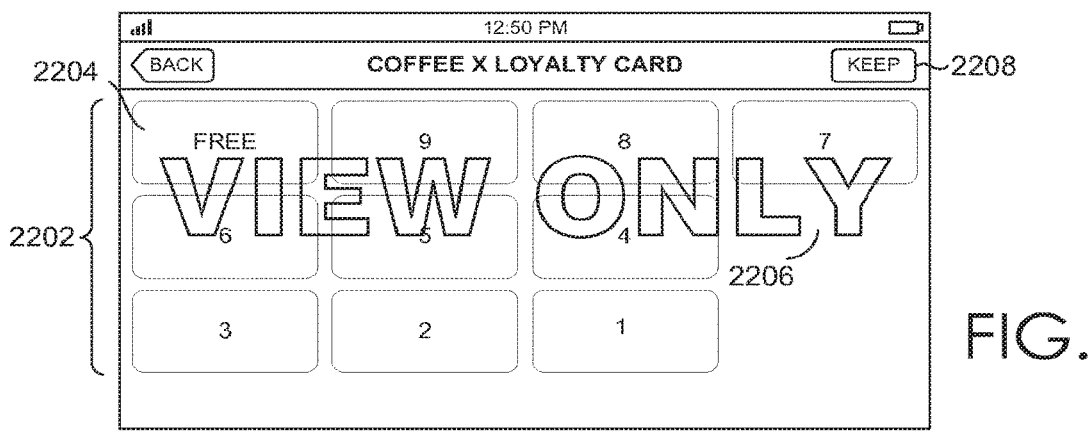
FIG. 22 is a drawing illustrating a user interface allowing a user to view a loyalty card, in accordance with an embodiment of the present invention.

Assume now that the user activated the Coffee X loyalty card by selecting the keep icon 2208 of FIG. 22. Upon selecting the keep icon 2208 in FIG. 22, the selected loyalty card is activated such that the user can utilize the loyalty card at the appropriate vendor. In this regard, the electronic loyalty card may be obtained and saved at the user device, such as user device 102 of FIG. 1, or may be stored for access at the vendor offer manager, such as the vendor offer manager 104 of FIG. 1.

Figure 23:
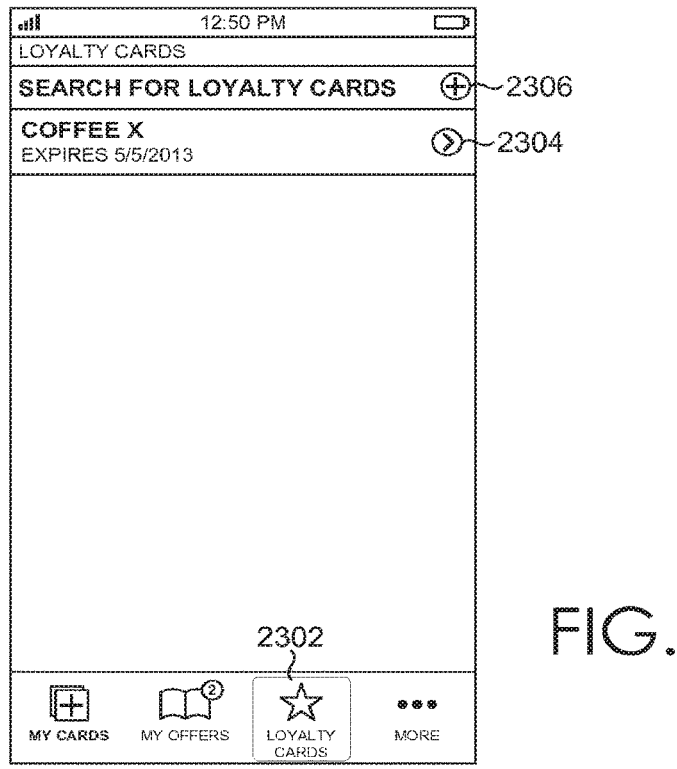
FIG. 23 is a drawing illustrating a user interface for presenting an indication of an activated loyalty card, in accordance with an embodiment of the present invention.

As illustrated in FIG. 23, the activated Coffee X loyalty card is now listed as an available loyalty card. In this regard, when the user selects to visit the Loyalty Cards feature 2302, the user can view and/or use the Coffee X loyalty card 2304 or elect to search for another loyalty card 2306. In some cases, all activated loyalty cards are automatically presented. In other cases, activated loyalty cards may be presented upon an occurrence of an event (e.g., an applicable search or indication of a specific loyalty card(s) to be presented).

Figure 24:
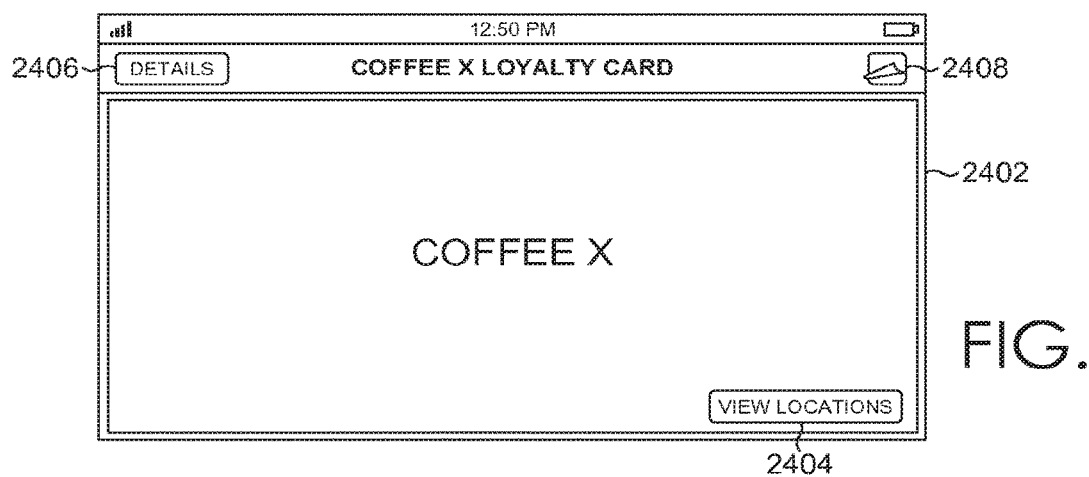
FIG. 24 is a drawing illustrating a user interface for presenting a front face of a discount card, in accordance with an embodiment of the present invention.
Figure 25:
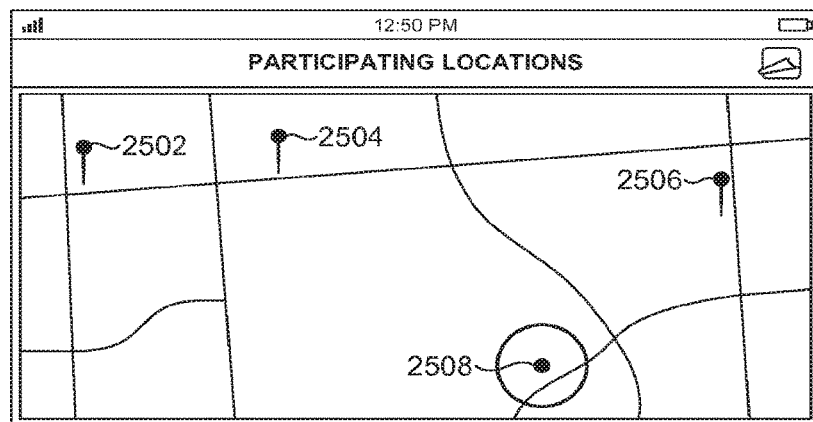
FIG. 25 is a drawing illustrating a user interface for presenting participating locations associated with a loyalty card, in accordance with an embodiment of the present invention.

Assume now that the user selects to view and/or use the Coffee X loyalty card by selecting Coffee X 2304 of FIG. 23. Based on the selection to view and/or use the Coffee X loyalty card, the front face 2402 of the Coffee X loyalty card is presented, as illustrated in FIG. 24. The front face of the Coffee X loyalty card may provide any number of details. The front face 2402 shown in FIG. 24 provides the user an ability to view vendor locations 2404. Such locations may indicate participating vendor locations and, in some cases, the location of the user. By way of example only, assume the user selects the view locations icon 2404. In such a case, the user can view various participating locations associated with Coffee X, such as a first location 2502, a second location 2504, and a third location 2506, as well as the user location 2508 in FIG. 25.

Returning to FIG. 24, the user can also select to view details 2406 associated with the Coffee X card. Such details may include available offers, contact information associated with the vendor, terms and conditions associated with the card, etc.

The user may also elect to rotate the loyalty card to view the rear face of the loyalty card having transactions (e.g., purchases) required to obtain an offer from the vendor. Such an election to view the rear face of the card can be provided by selecting an electronic rotate icon, such as rotate icon 2408 of FIG. 24.

Figure 26:
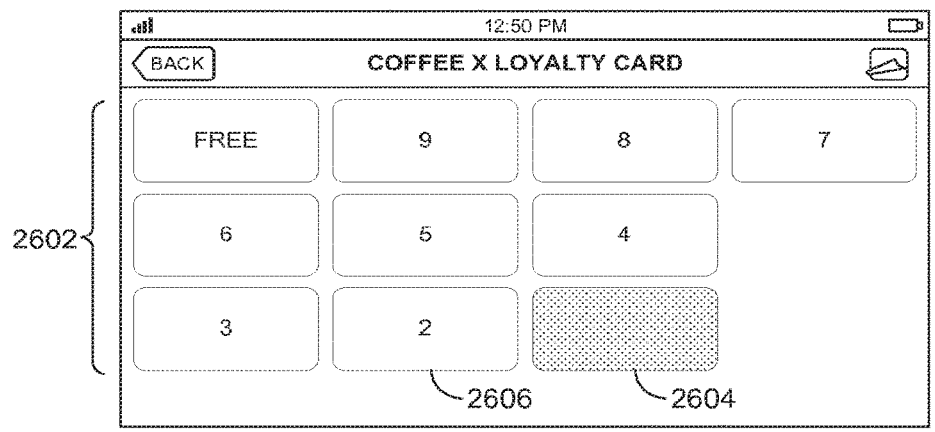
FIG. 26 is a drawing illustrating a user interface for presenting a rear face of a discount card, in accordance with an embodiment of the present invention.

For purposes of illustration, assume now that the user selects to view the loyalties required to obtain an offer by selecting the rotate icon 2408. In such a case, indications 2602 of the loyalties are provided via the rear face of the electronic loyalty card. As illustrated in FIG. 26, the presented indications may include completed loyalties and remaining loyalties to achieve a vendor offer. Completed loyalties, such as loyalties previously completed or fulfilled by the user, can be indicated as such (e.g., including a "stamp," a faded indication, or other demarcation or representation indicating that the loyalty is completed), as illustrated by loyalty indicator 2604. The user or vendor representative can select to complete a loyalty, for example, by selecting a particular loyalty indicator or loyalty portion (e.g., via a selector or a touch screen). Assume the user selects loyalty indicator 2606 of FIG. 26 to use the corresponding indication of a loyalty, such as a purchase.

Figure 27:
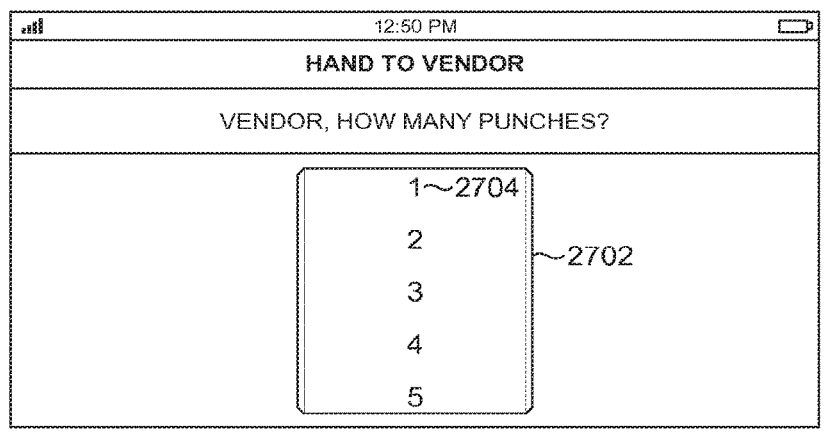
FIG. 27 is a drawing illustrating a user interface allowing an indication of a number of transaction fulfillments to be provided, in accordance with an embodiment of the present invention.
Figure 28:
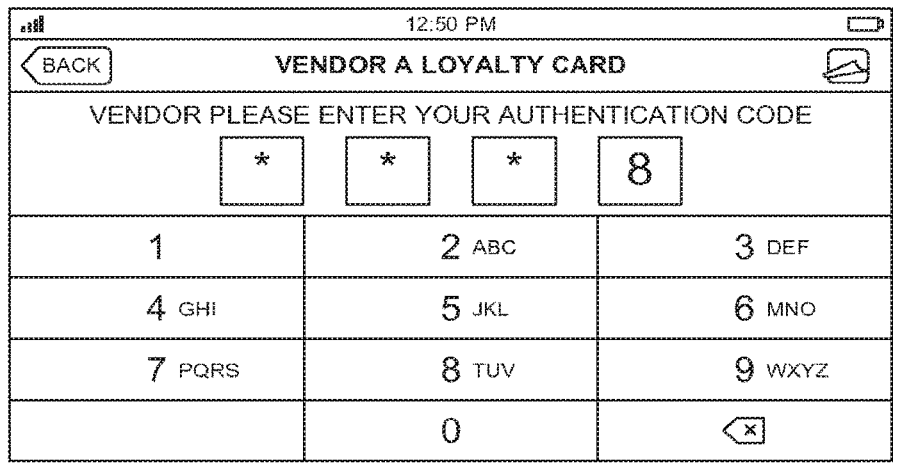
FIG. 28 is a drawing illustrating a user interface allowing an authentication code to be provided, in accordance with an embodiment of the present invention.

Upon selection of the loyalty indicator 2606, the user or vendor representative may be prompted to indicate a number of loyalty indicators to mark or designate as completed or fulfilled. For example, assume each loyalty indicator indicates a transaction for a coffee drink. In such a case, if two coffees are purchased in a visit, then two loyalty indicators can be designated as fulfilled. In some embodiments, the user may be requested to pass the user device to the vendor to provide the number of loyalty indicators to designate as fulfilled. In other embodiments, the vendor may verify that the user inputs the appropriate number of loyalty indicators to designate as fulfilled. For instance, FIG. 27 illustrates a user interface for providing a number of loyalty indicators 2702 to designate as fulfilled.

Upon selecting the number of loyalty indicators 2704, a vendor authentication code can be requested to verify that the fulfillment designation was appropriate (e.g., verifying the appropriate purchase was made or the appropriate amount of purchase). A vendor representative can then input an authentication code 2802 of FIG. 28 to verify the purchase. As can be appreciated, the authentication code can be any value (e.g., numerical or alphabetical) to identify the vendor. In some cases, the authentication code may change (e.g., daily, upon use of the code, upon use of the code for the particular consumer, hourly, weekly, etc.) for securing the use of the code.

Upon verifying the loyalty, the appropriate number of loyalty indicators are designated or indicated as fulfilled. For example, the appropriate number of loyalty indicators can be removed from the electronic loyalty card or otherwise indicated as fulfilled to appropriately reflect the number or amount of loyalties required until an offer can be redeemed.

Figure 29:
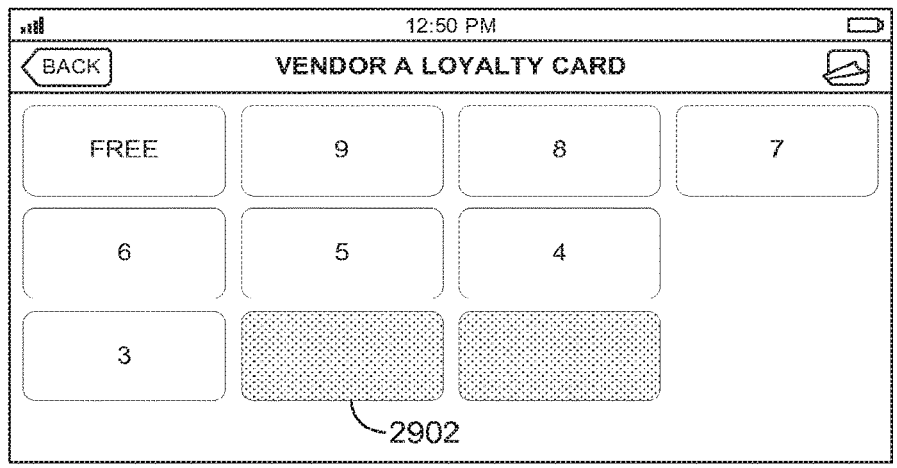
FIG. 29 is a drawing illustrating a user interface of a loyalty card presenting a recently fulfilled transaction, in accordance with an embodiment of the present invention.
Figure 33:
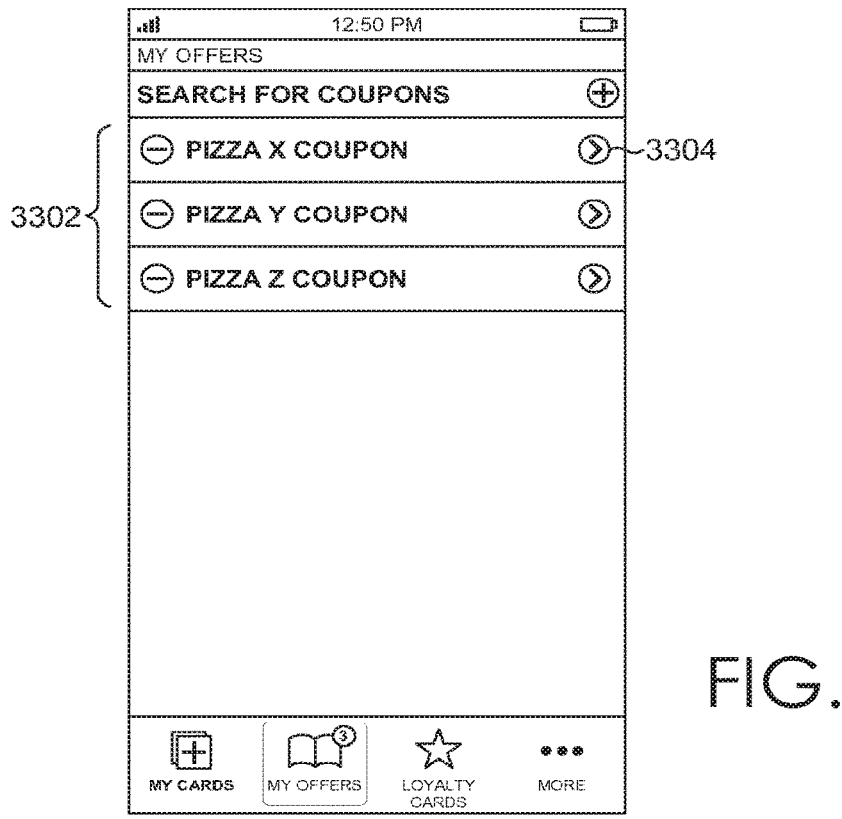
FIG. 33 is a drawing illustrating a user interface for providing group search results, in accordance with an embodiment of the present invention.

As illustrated in FIG. 29, the loyalty indicator 2902 is visually altered to indicate fulfillment of the second loyalty indicator 2902. As such, the user is required to make seven additional purchases to be able to redeem the offer. Upon the user completing or fulfilling loyalties one through nine, the user can redeem the offer, for example, the "free" item. Although FIGS. 18-29 generally pertain to consumer transactions (which may include purchases of event tickets), as can be appreciated, a similar implementation may be performed for user participations or attendance at vendor events.

Electronic Coupons

An electronic coupon refers to a coupon in electronic form that provides a user with a discount, gift, or reward (e.g., an item, product, service, points for accumulating and redeeming). Generally, a coupon is specific to a particular vendor to provide a discount with respect to that particular vendor. In some cases, however, a coupon may provide a discount or offer with respect to a different vendor. In embodiments of the present invention, an electronic coupon can be provided to a user for any number of reasons. As described more fully below, in some cases, electronic coupons are provided in association with use or non-use of a discount card, a loyalty card, or the like.

Returning to FIG. 1, the electronic coupons feature 122 of the vendor offer application 108 includes a coupon obtaining component 124 and a coupon managing component 126. In some embodiments, one or more of the illustrated components may be implemented as stand-alone applications. In other embodiments, one or more of the illustrated components may be integrated directly into the operating system of the user device 102 or other computing device, such as vendor offer manager 104. It will be understood by those of ordinary skill in the art that the components illustrated in FIG. 1 are exemplary in nature and in number and should not be construed as limiting. Any number of components may be employed to achieve the desired functionality within the scope of embodiments hereof. Further, components may be located on any number of servers or computers.

The electronic coupons feature 122 is configured to enable a user to obtain and/or manage one or more electronic coupons via the user device 102. As such, a user can electronically redeem offers obtained by the user. As previously described, the electronic coupon feature 122 can be a stand-alone application, be part of the vendor offer application 108, or be provided via a website accessible via a web browser. In some embodiments, and as described in more detail below, the electronic coupon feature 122 might access the electronic coupon service 134 of the vendor offer manager 104 to facilitate implementation of the electronic coupons feature 122 on the user device.

The coupon obtaining component 124 is configured to obtain electronic coupons. Obtaining electronic coupons can be performed in any number of ways. In some cases, a user may initiate reception of a coupon. By way of example and not limitation, a user might participate in a contest that provides electronic coupons as rewards, register to receive a coupon, select a coupon via the web, search for coupons via vendor offer application 108, etc.

In other cases, an electronic coupon might be provided to a user, for instance, based on an indication from a vendor. In this regard, a vendor may indicate a desire to transmit an electronic coupon to a consumer or a group of consumers. For instance, a vendor may wish to provide an electronic coupon to a consumer(s) based on a consumer activating a discount card or loyalty card, a consumer completing a discount card or loyalty card, a consumer's usage (e.g., percent complete) of a discount card or a loyalty card, a consumer's lack of usage of a discount card or a loyalty card (e.g., no use within a particular time frame), or the like.

In yet other cases, an electronic coupon may be automatically provided to a consumer or group of consumers based on similar attributes as those that might be assessed by a vendor. That is, an electronic coupon may be automatically provided to a consumer based on a consumer activating a discount card or loyalty card, a consumer completing a discount card or loyalty card, a consumer's usage (e.g., percent complete) of a discount card or a loyalty card, a consumer's lack of usage or failure to use a discount card or a loyalty card (e.g., no use within a particular time frame), or the like. In this regard, providing an electronic coupon can be automatically determined based on rules or thresholds. Upon such a determination, in embodiments, electronic coupons may be automatically generated and/or distributed.

Electronic coupons can be provided by any number of entities or computing components. For example, in some cases, electronic coupons can be initiated from a computing device associated with a vendor such that the vendor transmits an electronic coupon to the vendor offer application 108. In other cases, electronic coupons can be initiated from the vendor offer application 108 and/or the vendor offer manager 104. For instance, a vendor representative may evaluate consumer transactions and provide an indication to the electronic coupon service 134 of the vendor offer manager 104 to provide an electronic coupon to one or more consumers. Such coupons can be of any value or nature and, in some case, can be customizable to the particular consumer.

In another example, a computing device can analyze consumer transaction data and determine whether to provide an electronic coupon to a consumer(s) and/or a type of coupon to provide to a consumer(s) (e.g., a value amount, a discount for a particular item, etc.). Such an analysis can be performed, for instance, at the user device 102, the vendor offer manager 104, and/or another computing device, such as a computing device associated with a vendor.

As previously described, in some embodiments, providing an electronic coupon might be based on a consumer activating a discount card or loyalty card, a consumer completing a discount card or loyalty card, a consumer's usage (e.g., percent or portion complete) of a discount card or a loyalty card, a consumer's lack of usage or failure to use a discount card or a loyalty card, or the like. Such data might be tracked based on utilization of a discount card and/or a loyalty card associated with the vendor. In this regard, the discount cards feature 110 of the user device 102, the loyalty cards feature 116 of the user device 102, the discount cards service 130 of the vendor offer manager 104, and/or the loyalty cards service 132 of the vendor offer manager 104 might monitor, track, and/or store usage of the corresponding card, and/or transactions/participations associated therewith.

For instance, and as previously described, assume that a user utilizes a loyalty card associated with Vendor A to indicate a drink has been purchased. Such a purchase can be relayed to the loyalty cards service 132 so that appropriate transaction data can be stored (e.g., a purchase of an item, an amount spent, usage of the loyalty card, etc.). Now assume that the user also has a discount card associated with Vendor A and utilizes the discount card to receive a free small pizza with the purchase of a large pizza. Such a purchase can be provided to the discount cards service 130 so that appropriate loyalty data (e.g., transaction data and/or participation data) can be stored (e.g., a purchase of an item, an amount spent, usage of the discount card, etc.). Thereafter, the transaction data/participation data stored in association with the loyalty card and the discount card can be assessed to determine whether to send an electronic coupon to the consumer, when to send an electronic coupon to the consumer, and/or a type of electronic coupon to send to the consumer. Such an assessment can be performed, for example, by a vendor representative, a computing device, etc. By way of example only, analyzing the transaction data might result in an electronic coupon being communicated to the vendor offer application 108 or generated at the vendor offer application 108 based on the user not completing a transaction with Vendor A within a particular amount of time (e.g., one month), a user fulfilling a loyalty card, a user acquiring a particular amount of points for using a loyalty card, a user spending a particular amount of money with Vendor A, or the like. Although this example describes loyalty data being stored at the vendor offer manager 104, loyalty data can be stored in any number of locations or combination of locations, such as, the user device 102, a computing device hosted by the vendor, etc.

As can be appreciated, in some cases, a user can additionally or alternatively receive coupons having various offers for free deals, discounts, points, etc. via the user's email account. For instance, in cases that a user does not have a mobile device or otherwise chooses not to use a mobile device, the user can register a physical card via a website to receive coupons. To register, the user may provide any number of details, such as, a name and an email address. As the vendor and/or computing device determines to provide the user with a coupon, such a coupon can be emailed to the user along with a unique code for the particular offer. The unique code can be used at the time of the loyalty to verify availability of the offer. Such loyalty data can also be tracked, monitored, and/or saved and, utilized to analyze if and when to provide a coupon, a type of coupon to provide, etc.

The coupon managing component 126 is configured to facilitate utilization of obtained electronic coupon(s). Initially, an indication is provided that a user would like to view and/or utilize a previously obtained electronic coupon. In some cases, to specify a particular electronic coupon to utilize, a user may select to use the electronic coupons feature 122 resulting in a list of obtained electronic coupons being provided. Such a listing of electronic coupons may be coupons that have been received but that have not expired. The available electronic coupons can be presented along with an option to search for additional electronic coupons to view and/or acquire.

As can be appreciated, a list of available coupons can be presented in any manner. In embodiments, available electronic coupons are listed alphabetically, in order of expiration date, in order of vendor location relative to the user, etc. For each listed coupon, any amount of information can also be provided. For example, an identification of the vendor associated with the coupon (e.g., vendor name) may be presented along with a corresponding expiration date, an indication of more details, and/or the like.

Upon selection of an indication of a particular electronic coupon, the coupon managing component 126 facilitates providing the electronic coupon, or a portion thereof. As the electronic coupon, or data associated therewith, can be stored at the user device 102 and/or the vendor offer manager 104, such data can be retrieved or received from the appropriate location and thereafter provided for display via the user device 102.

The selected electronic coupon can be displayed in any manner. For instance, an electronic coupon might resemble a physical coupon in that it might have a front face and a rear face of the card. The front face may include, or have links to, general details of the coupon, such as an identification of the coupon, contact information associated with the vendor of the coupon, terms and conditions associated with the coupon, expiration of the coupon, etc. The rear face of the coupon may include, or have links to, details related to the offer provided by the coupon. An electronic coupon resembling a physical coupon, however, is not intended to limit the scope of embodiments of the present invention.

An electronic coupon can, in some embodiments, be customizable to the vendor and/or the consumer. That is, a first coupon to a first consumer might be directed to a first item or be for a first amount while a second coupon to a second consumer might be directed to a second item or be for a second amount. As can be appreciated, in some embodiments, vendor customizations may be input and/or managed by a representative of the vendor offer application 108 (e.g., to the electronic coupons service 134). In other embodiments, vendor customizations may be input and/or managed by a representative of the vendor. In such an embodiment, a vendor may be able to provide customization options to the vendor offer manager 104, such as the electronic coupons service 134, such that the vendor offer manager 104 can generate the coupons based on the customizations provided by the vendor. A vendor may provide customization options in any manner, such as, for instance, by accessing a web page via a web browser. The vendor representative can input or select customization options through the web page and provide such customizations to the vendor offer manager 104.

In addition to displaying a selected coupon, the coupon managing component 126 is configured to facilitate redeeming an offer associated with a coupon. That is, a user can select to use or redeem the offer that he or she would like to redeem. Upon selecting the offer or coupon for redemption, the electronic coupon can be removed as available or can be otherwise indicated as unavailable (e.g., presented as faded, presented with a different format, presented in a different color, presented with an overlay or icon over the offer, etc.) such that the user cannot subsequently utilize the electronic coupon.

Using or redeeming an electronic coupon can include alternative or additional implementations. For instance, in some cases, the user or vendor representative may be required to confirm the utilization of the electronic coupon. In this regard, a user or vender representative may select a confirmation icon and/or enter an authentication code to confirm redemption of an electronic coupon.

The use or redemption of an electronic coupon can be captured such that the user cannot subsequently use the same offer. In this way, data related to redemption of the coupon can be saved, for example, at the user device 102 or remote from the user device 102 (e.g., vendor offer manager 104). By way of example, and not limitation, data related to redemption of the electronic coupon may be a time and/or date associated with using the coupon, an identification of the coupon, the user utilizing the coupon, the vendor associated with the coupon, etc. Captured data associated with use of an electronic coupon can be used, for example, to provide a modified listing of available coupons accurately reflecting unavailable coupons, to determine whether to provide a coupon to the user, to determine a type of coupon to provide to the user, or the like.

As can be appreciated, many different embodiments can be utilized to facilitate management of electronic coupons. FIGS. 30-36 provide an example of one implementation that can be employed by a vendor offer application, such as the vendor offer application 108, to enable a user to obtain and utilize electronic coupons. FIGS. 30-36 are provided merely for exemplary purposes and are not intended to limit the scope of embodiments of the invention.

Initially, after opening the vender offer application 108, a user may select an indication to use the electronic coupons feature 122, particularly when multiple features (e.g., loyalty cards feature, discount cards feature, etc.) are offered or provided. For example, and with reference to FIG. 30, the user may select the My Offers icon 3002 to initiate interaction with the electronic coupons feature 122 of FIG. 1. As described in more detail herein, the user can also be presented with options to interact with other features, such as the loyalty cards feature and the discount cards feature.

After selecting the My Offers icon 3002, the user is presented with an option to search for electronic coupons (e.g., by vendors), as illustrated in FIG. 31. The emphasis placed on the My Offers icon 3102 indicates that the user is utilizing the electronic coupons feature. As illustrated in FIG. 31, the user has an opportunity to search for available coupons. To initiate a search for coupons, the user can select a search indication, such as search indication 3104 to initiate a search for available coupons. In some cases, the search for coupons is to search for previously obtained coupons that are available to the user. In additional or alternative embodiments, searching for coupons may enable a user to search for coupons provided by a vendor that the user would like to obtain.

Assume the user selects to search for electronic coupons by selecting search indication 3104 in FIG. 31. Upon such a selection, a search user interface 3200 of FIG. 32 can be presented. The search user interface 3200 of FIG. 32 provides a user an opportunity to search for electronic coupons using a vendor name 3202, a vendor category 3204, and/or a location 3206 (e.g., associated with a vendor or user). As such, the user can elect to provide or input a name associated with a vendor of interest. For instance, the user may enter Pizza X to locate coupons associated with vendor Pizza X. Alternatively, the user may enter a category, for example, "pizza" to identify coupons associated with pizza vendors. Additionally or alternatively, a user might provide a location 3206. Such an indication of a location might be provided by a geographical area in which vendors and/or users are located. For instance, a user might input a state and/or city to identify potential coupons associated with that particular state and/or city. In other embodiments, a location may be automatically derived based on the GPS or cellular identified location of the user device being used by the user. In this regard, a user may provide an indication to utilize the current location, and a search may be performed using the GPS or cellular identified location.

To initiate the search, a user can select the search button 3208. A search can then be performed to identify electronic coupons that meet the criteria provided in association with the name 3202, the category 3204, and/or the location 3206. By way of example, assume that a user enters "pizza" as the category 3204 and wishes to search using the current location of the user. In such a case, and as illustrated in 3302 of FIG. 33, electronic coupons associated with pizza in the vicinity of the current location of the user are provided. As previously described, such electronic coupons may be coupons already obtained by the vendor offer application 108 or coupons desired by the user to be obtained by the vendor offer application 108.

The user can then select to view and/or purchase an electronic coupon in any manner. In one example, the user selects a desired electronic coupon, such as Pizza X coupon 3304 of FIG. 33. Upon selecting an indication of the Pizza X coupon 3304 of FIG. 33, the user is presented with details of the Pizza X coupon. As can be appreciated, any number and manner of coupon details can be provided. In one embodiment, a user is able to view the electronic coupon. Such a coupon may have a front face that indicates the details of the coupon (e.g., vendor name, vendor contact information, vendor locations, vendor locations relative to user location, etc.). For instance, and with reference to FIG. 34, a front face of an electronic coupon for Pizza X is illustrated. The user might have options to view vendor locations in which the coupon can be redeemed by selecting view locations icon 3402, view additional details associated with the coupon by selecting the details icon 3404, and/or rotate the coupon by selecting the rotate icon 3406.

Figure 34:
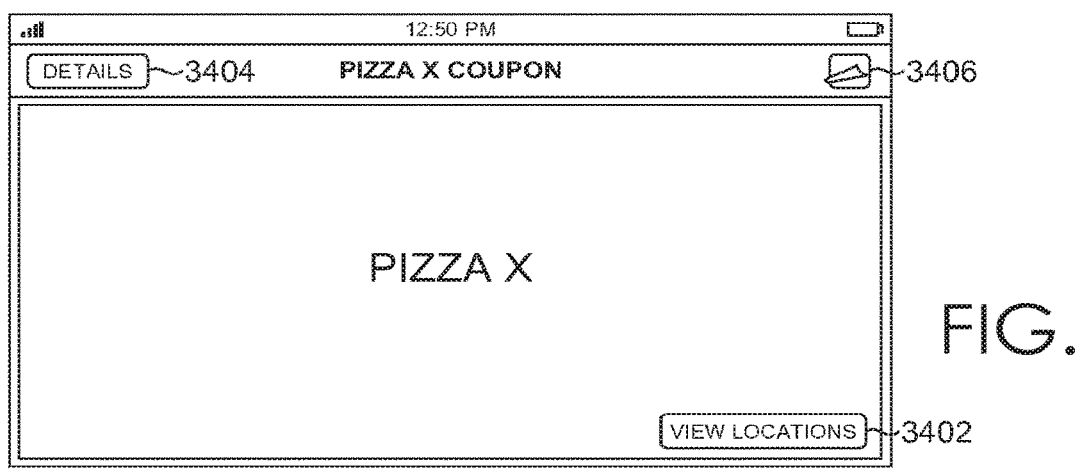
FIG. 34 is a drawing illustrating a user interface for presenting an electronic coupon, in accordance with an embodiment of the present invention.
Figure 35:
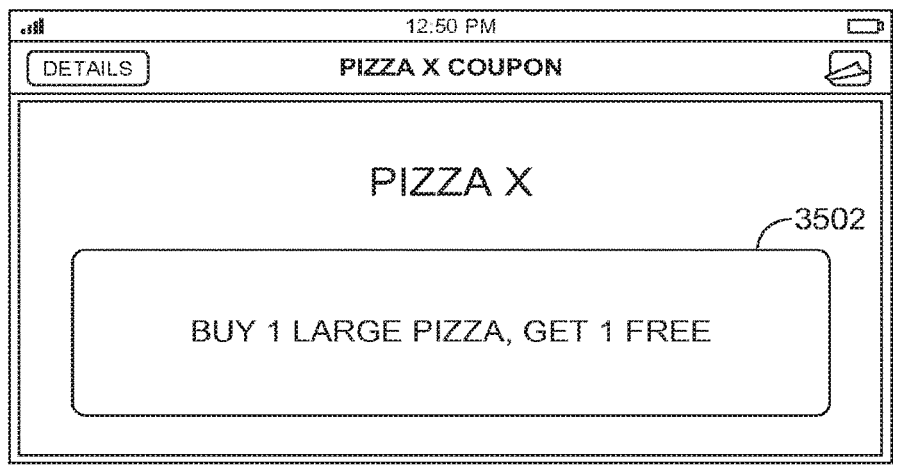
FIG. 35 is a drawing illustrating a user interface for presenting an offer associated with an electronic coupon, in accordance with an embodiment of the present invention.

For purposes of illustration, assume now that the user selects to view the available offers by selecting the rotate icon 3406 of FIG. 34. In such a case, the available offer 3502 of FIG. 35 from the vendor is provided via the rear face of the electronic coupon. The user can select to utilize an offer, for example, by selecting the offer 3502 (e.g., via a selector or a touch screen).

Figure 36:
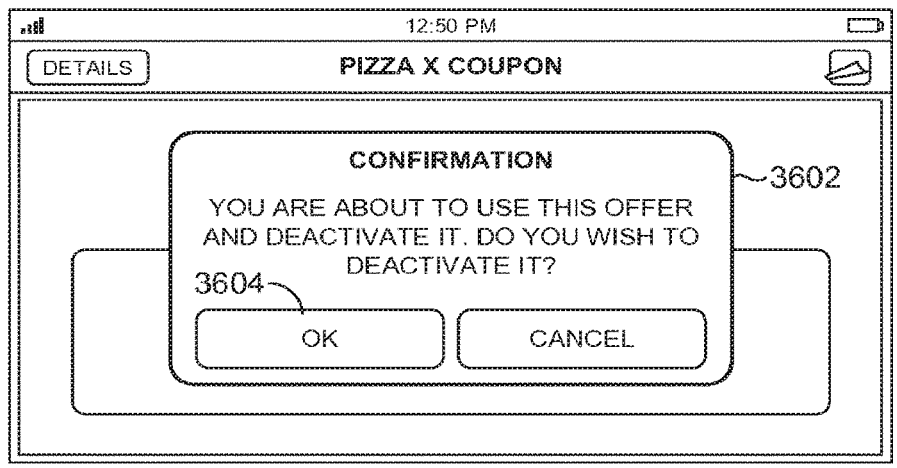
FIG. 36 is a drawing illustrating a user interface allowing a user to confirm utilization of an offer, in accordance with an embodiment of the present invention.

Now assume the user selects the offer 3502 available via the coupon to use the electronic coupon. Upon selecting to utilize the offer 3502 of FIG. 35, a confirmation to use the offer may be presented. In some cases, as illustrated in FIG. 36, a confirmation notice 3602 indicating that the offer is about to be deactivated and requesting confirmation can be provided. Upon confirming the deactivation, such as by selection of OK icon 3604, the electronic coupon is indicated as deactivated or unavailable. Other methods can be used to deem a coupon unavailable or used, and those provided herein are not intended to limit the scope of embodiments of the invention. For instance, a vendor representative (e.g., an employee of the vendor) could provide an authentication code that removes the electronic coupon. Alternatively, the coupon may simply remain available for repeated use by the user until it reaches an expiration date.

Based on the Pizza X coupon being used or redeemed, the electronic coupon for Pizza X is removed from the list of available coupons such that the coupon cannot be subsequently used by the user (unless a new coupon is provided to the user). Further, such a usage or redemption of the electronic coupon can be captured, and/or data associated therewith, for use in tracking consumer transactions associated with the Pizza X vendor. Such data can be captured at the user device 102, the vendor offer manager 104, and/or another computing device (e.g., associated with the vendor).

In addition to providing the discount cards feature, the loyalty cards feature, and/or the electronic coupons feature, the vendor offer application 108 can provide other data that generally pertains to the application. For example, and with reference to FIG. 37, assume that a user selects a More icon 3702 to view more details or information. After selecting the More icon 3702, the user is presented with an option to view additional data, such as terms and a website, as illustrated in FIG. 38. The emphasis placed on the More icon 3802 indicates that the user has selected to view additional information. The user has the option to view information related to the terms and conditions of the vendor offer application 108 or to view the associated website. Assume that the user wishes to view the website and, as such, selects the website indicator 3804 to view the website. In such a case, the website 3902 is presented to the user, as illustrated in FIG. 39.

Turning now to FIGS. 40-46, flow diagrams illustrating various methods for implementing embodiments of the present invention are provided. With initial reference to FIG. 40, a flow diagram is illustrated showing a method 4000 for activating a discount card in accordance with an embodiment of the present invention. Method 4000 is but one example of a suitable method and is not intended to suggest any limitation as to the scope of the invention.

Initially, as indicated at block 4002, an indication to search for one or more discount cards is received. In this regard, a user may provide an indication of a desire to search for one or more discount cards. At block 4004, at least one search criteria to use in searching for a discount card(s) is received. Such search criteria may be, for example, a vendor name, a vendor category, a vendor location, a group name, a group category, a group location, a user location, and/or the like. A search is facilitated for a discount card(s) in accordance with the search criteria, as indicated at block 4006. In some cases, such a search is performed at the user device. In other cases, such a search can be performed at a computing device remote from the user device, such as the vendor offer manager 104.

Upon completing the search, the identified discount cards that match the search criteria are presented. This is indicated at block 4008. Subsequently, at block 4010, an indication to activate a discount card is received. Such an indication can be provided in any manner. For example, a user may select a particular discount card to provide an indication to activate the discount card. At block 4012, activation of the discount card is initiated. By way of example, and without limitation, activation of a discount card might be initiated by confirming a desire to activate the discount card and/or completing a purchase of the discount card. By initiating activation of the discount card, the discount card is made available to the user for use at a participating vendor(s). In this regard, upon activation of the discount card, the user is able to redeem offers provided in association with the discount card.

Turning now to FIG. 41, a flow diagram is illustrated showing a method 4100 for utilizing an offer provided in association with a discount card, in accordance with an embodiment of the present invention. Method 4100 is but one example of a suitable method and is not intended to suggest any limitation as to the scope of the invention. Initially, as indicated at block 4102, a selection of an activated discount card is received. At block 4104, at least a portion of the selected discount card is presented. Such a discount card may be presented, for example, to a user via a user device. In embodiments, upon selection to view a discount card, the card or a portion thereof, is received or retrieved, for instance, via the vendor offer application or the vendor offer manager. Thereafter, an indication to utilize an offer available on the selected discount card is received, as indicated at block 4106. In some cases, such a selection can be provided by a user selecting the specific offer that he or she wishes to use. At block 4108, verification of utilization of the offer is initiated. Such a verification can be initiated, for instance, by selecting a confirmation indicator to confirm utilization of the offer. Based on the indication to utilize the offer, and verification thereof, the offer is removed or otherwise indicated as unavailable such that it is no longer available for use in association with the discount card. This is indicated at block 4110.

With reference to FIG. 42, a flow diagram is illustrated showing a method 4200 for activating a loyalty card, in accordance with an embodiment of the present invention. Method 4200 is but one example of a suitable method and is not intended to suggest any limitation as to the scope of the invention. Initially, as indicated at block 4202, an indication to search for one or more loyalty cards is received. In this regard, a user may provide an indication of a desire to search for one or more loyalty cards. At block 4204, at least one search criteria to use in searching for a loyalty card(s) is received. Such search criteria may be, for example, a vendor name, a vendor category, a vendor location, a user location, and/or the like. A search is facilitated for a loyalty card(s) in accordance with the search criteria, as indicated at block 4206. In some cases, such a search is performed at the user device. In other cases, such a search can be performed at a computing device remote from the user device, such as the vendor offer manager 104.

Upon completing the search, the identified loyalty cards that match the search criteria are presented. This is indicated at block 4208. Subsequently, at block 4210, an indication to activate a loyalty card is received. Such an indication can be provided in any manner. For example, a user may select a particular loyalty card to provide an indication to activate the discount card. At block 4212, activation of the loyalty card is initiated. By way of example, and without limitation, activation of a loyalty card might be initiated by confirming a desire to activate the loyalty card and/or completing a purchase of the loyalty card. By initiating activation of the loyalty card, the loyalty card is made available to the user for use at a participating vendor(s). In this regard, upon activation of the loyalty card, the user is able to track transactions at the participating vendor(s) and redeem offers provided in association with the loyalty card.

Turning now to FIG. 43, a flow diagram is illustrated showing a method 4300 for utilizing an offer provided in association with a loyalty card, in accordance with an embodiment of the present invention. Method 4300 is but one example of a suitable method and is not intended to suggest any limitation as to the scope of the invention. Initially, as indicated at block 4302, a selection of an activated loyalty card is received. At block 4304, at least a portion of the selected loyalty card is presented. Such a loyalty card may be presented, for example, to a user via a user device. In embodiments, upon selection to view a loyalty card, the card or a portion thereof, is received or retrieved, for instance, via the vendor offer application or the vendor offer manager. Thereafter, an indication to utilize the selected loyalty card is received, as indicated at block 4306. In some cases, use of the loyalty card pertains to tracking a current transaction. In other cases, use of the loyalty card pertains to redeeming an offer, for example, that is available to the user based on attaining a target set of transactions. At block 4308, verification of utilization of the loyalty card is initiated. Such a verification can be initiated, for instance, by selecting a confirmation indicator to confirm a current transaction or utilization of the offer. Based on the indication to utilize the loyalty card, and verification thereof, the loyalty card is updated to reflect the use of the loyalty card. This is indicated at block 4310. In this way, in a case that a current transaction occurs, an appropriate transaction required to obtain an offer is removed or indicated as fulfilled. In a case that an offer is being utilized, the offer is removed or otherwise indicated as unavailable such that it is not available for use in association with the loyalty card.

With reference to FIG. 44, a flow diagram is illustrated showing a method 4400 for using an electronic coupon, in accordance with an embodiment of the present invention. Method 4400 is but one example of a suitable method and is not intended to suggest any limitation as to the scope of the invention. Initially, as indicated at block 4402, an electronic coupon associated with a vendor is obtained. In embodiments, an electronic coupon is obtained based on an initiation by a user, by a vendor, or a computing device. At block 4404, a coupon notification is provided. Such a coupon notification can provide an indication to the user that an electronic coupon has been obtained. At block 4406, an indication to view the electronic coupon is received. For example, a user might provide a desire to view the electronic coupon. In response, the coupon is presented, as indicated at block 4408. At block 4410, an indication to utilize the coupon is received. In this way, a user can provide an indication to utilize the electronic coupon. At block 4412, verification of utilization of the electronic coupon is initiated. Such a verification can be initiated, for instance, by selecting a confirmation indicator to confirm a use of the electronic coupon. Based on the indication to utilize the electronic coupon, and verification thereof, the electronic coupon is made unavailable for subsequent use. This is indicated at block 4414. In this regard, the electronic coupon might be removed as an available coupon or otherwise designated as unavailable for subsequent use.

Turning now to FIG. 45, a flow diagram is illustrated showing a method 4500 for providing an electronic coupon, in accordance with an embodiment of the present invention. Method 4500 is but one example of a suitable method and is not intended to suggest any limitation as to the scope of the invention. For example, although method is provided in relation to transactions, such a method can also be used in relation to other loyalty data, such as interaction data or participation data. Initially, as indicated at block 4502, transaction data associated with at least one consumer of a vendor is received. Subsequently, at block 4504, the transaction data is stored. At block 4506, an electronic coupon associated with the vendor is transmitted to one or more consumers that qualify for the electronic coupon based on the transaction data. In embodiments, such a qualification can be determined via a vendor, a vendor representative, or a computing device. Qualification for an electronic coupon can be deemed based on any number of rules and/or thresholds. By way of example, and not limitation, a consumer may be qualified for an electronic coupon upon activating a loyalty card or a discount card, upon use of a loyalty card or a discount card, upon a particular number of transactions, upon a particular monetary amount of transactions, upon a particular amount of non-use of a loyalty card or a discount card, upon a failure to exceed a minimal monetary threshold, upon acquiring a particular amount of points (e.g., based on use of a loyalty card), or the like.

Figure 46:
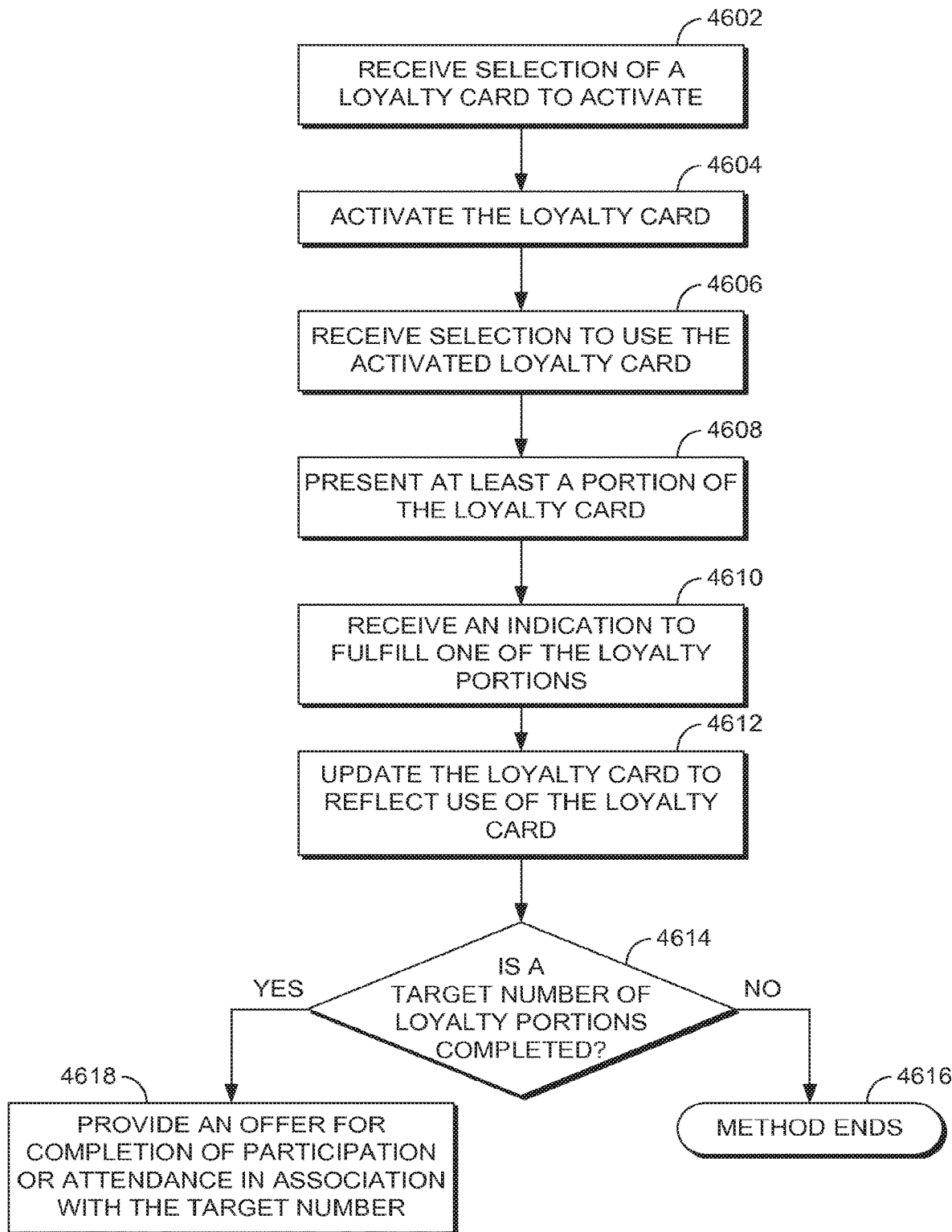
FIG. 46 is a flow diagram in which a method of utilizing a loyalty card based on interactions with an entity, in accordance with an embodiment of the present invention.

Turning now to FIG. 46, a flow diagram is illustrated showing a method 4600 for utilization of a loyalty card associated with interaction with an entity, in accordance with an embodiment of the present invention. Method 4600 is but one example of a suitable method and is not intended to suggest any limitation as to the scope of the invention. Initially, as indicated at block 4602, a selection of a loyalty card to activate is received. Such a loyalty card can be associated with any entity. In some embodiments, the loyalty card is associated with a scholastic institution, a scholastic organization, or a non-profit organization. At block 4604, the loyalty card is activated. At block 4606, a selection to utilize the activated loyalty card is received. Thereafter, as indicated at block 4608, at least a portion of the selected loyalty card is presented. Such a loyalty card may be presented, for example, to a user via a user device. In embodiments, upon selection to view a loyalty card, the card or a portion thereof, is received or retrieved, for instance, via the vendor offer application or the vendor offer manager.

At block 4610, an indication to fulfill one of the loyalty portions provided on the loyalty card is received. A loyalty portion can refer to a portion on the loyalty card indicating attendance of an event (e.g., associated with the entity, associated with a portion of the entity, hosted by the entity, sponsored by the entity, etc.), participation of an event, or other support of an event (e.g., a financial contribution, a planning/implementing contribution, etc.). In some cases, verification of utilization of the loyalty card is initiated. Such a verification can be initiated, for instance, by selecting a confirmation indicator to confirm a current interaction with the entity. Based on the indication to fulfill a loyalty portion (and potentially verification thereof), the loyalty card is updated to reflect the use of the loyalty card. This is indicated at block 4612. In this way, in a case that a current interaction or participation occurs, an appropriate interaction or participation required to obtain an offer is removed or indicated as fulfilled.

At block 4614, a determination is made as to whether a target number or predetermined number of loyalty portions have been completed or fulfilled. For example, a determination may be made as to whether a particular number of events hosted by a school have been participated in and/or attended, or whether a particular number of events hosted by a specific school organization have been participated in and/or attended. If it is determined that a target number or predetermined number of loyalty portions have not been completed, the method ends, as indicated at block 4616.

On the other hand, if it is determined that a target number or predetermined number of loyalty portions have been completed, an offer is provided for completion of participation or attendance in association with a predetermined number of entity events, such as events hosted by or sponsored by the entity. This is indicated at block 4618. Such an offer may be any number of items, such as, for instance, a free attendance to an event hosted by the entity, a discounted attendance to an event hosted by the vendor, a free attendance to an event hosted by another entity, or a discounted attendance to an event hosted by another entity. Events may include, by way of example and not limitation, a school function, a class, a seminar, a conference, a formal or social event, a sports event, or any other event. Such an implementation allows an entity, such as a school, school organization, or non-profit organization to reward students, faculty, parents, alumni, or other supporters for their support or attendance at various events.

By way of example only, upon attending ten sporting or art events affiliated with a particular school, the school may wish to grant the supporter with a free admission to another similar event or an education event. In another example, upon a student's efforts in organizing several school events, the school may wish to provide the student with an opportunity to attend the event(s) or another event(s) for free or with a discounted admission. As can be appreciated, the supporters attendance at events or the student's efforts in organizing events can be captured in any desired manner. For instance, attendance at the events, purchase of event tickets, amount of money spent, amount of time dedicated, or the like can be used to track a user's interactions and/or participations.

Many different arrangements of the various components depicted, as well as components not shown, are possible without departing from the spirit and scope of the present invention. For example, instead of a user having to search for a discount card, a loyalty card, and/or an electronic coupon of interest, the user may be able to locate the same directly via various input means. In one embodiment a user may be at a vendor establishment, such as at a Pizza X restaurant, because the user likes that vendor's product. The user may see an offer to obtain one of the vendor's discount cards, loyalty cards, and/or electronic coupons in a piece of print advertisement in the establishment, such as on a table tent display. The print advertisement may be provided with an identifier, such as a QR code, that, when scanned, places one of the vendor's discount cards, loyalty cards, and/or electronic coupons in the vendor offer application 108 of the user's device 102. If the user does not have the vendor offer application 108 on their device 102, the identifier may redirect the user's device 102 to a remote server, such as vendor offer manager 104, a website, or a mobile application store where the vendor offer application 108 can be downloaded to the device 102 and the desired card or coupon inserted in the vendor offer application 108. A similar scenario could occur from an identifier on a flyer or brochure received by a user in the postal mail. In another embodiment, the offer, gift, reward, or electronic coupon provided to the user may be a representation of a paper coupon with a barcode thereon. The displayed barcode could then be scanned by the vendor to redeem the coupon and to simultaneously or subsequently deactivate that specific coupon so that it can not be redeemed again. The deactivation could take place in the vendor offer manager 104.

Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. A system to manage different types of electronic vendor offers, wherein the electronic vendor offers comprise discount vendor offers associated with electronic cards, the system comprising:

a processor; and computer storage memory having computer-executable instructions stored thereon which, when executed by the processor, configure the system to:

provide, via an electronic vendor offer manager, an image rotate icon and a front face image of an electronic card for display via a graphical user interface at a user device;

receive a user selection, at the image rotation icon, to rotate from the front face image to a rear face image of the electronic card;

rotate the front face image of the electronic card to a rear face image of the electronic card on the display of the graphical user interface, the rear face image having at least one selectable electronic vendor offer;

in response to rotating to the rear face image of the electronic card for display of the at least one selectable electronic vendor offer, receive a selection of the at least one selectable electronic vendor offer on the rear face image of the electronic card;

facilitate redemption of the at least one selectable electronic vendor offer based on the selection of the at least one selectable electronic vendor offer; and provide an indication on the display of the graphical user interface that the redemption has been facilitated and that the at least one selectable electronic vendor offer is no longer available.

2. The system according to claim 1, wherein the electronic card is provided for display, and
wherein the front face image of the electronic card includes one or more of: front face discount card data and links to the front face discount card data,
wherein the front face discount data includes one or more of: identification data of the electronic card, contact information data associated with the electronic card, terms and conditions data associated with the electronic card, and expiration data of the electronic card; and
wherein the rear face image of the electronic card includes one or more of: rear face discount card data and links to the rear face discount card data associated with the at least one selectable electronic vendor offer,
wherein the rear face discount card data includes one or more offers data provided by the electronic card.

3. The system according to claim 1, wherein the electronic card is an electronic loyalty card that is provided for display, and
wherein the front face image of the electronic loyalty card includes one or more of: front face loyalty card data and links to the front face loyalty card data,
wherein the front face loyalty card data includes one or more of: identification data of the electronic loyalty card, contact information data associated with the electronic loyalty card, terms and conditions data associated with the electronic loyalty card, and expiration data of the electronic loyalty card; and
wherein the rear face image of the electronic loyalty card includes one or more of: rear face loyalty card data and links to the rear face loyalty card data associated with the at least one selectable electronic vendor offer,
wherein the rear face loyalty card data includes one or more of: offers data provided by the electronic loyalty card and user usage data of the electronic loyalty card or tracking of user loyalty data.

4. The system according to claim 1, wherein the electronic card is an electronic coupon that is provided for display, and
wherein the front face image of the electronic coupon includes one or more of: front face coupon data and links to the front face coupon data,
wherein the front face coupon data includes one or more of: identification data of the electronic coupon, contact information data associated with the electronic coupon, terms and conditions data associated with the electronic coupon, and expiration data of the electronic coupon; and
wherein the rear face image of the electronic coupon includes one or more of: rear face coupon data and links to the rear face coupon data associated with the at least one selectable electronic vendor offer, wherein the rear face coupon data includes one or more of the vendor offers provided by the electronic coupon.

5. The system according to claim 1, further comprising initiating a search for the electronic card according to a user-provided search criteria.

6. The system according to claim 1, further comprising activating the provided electronic card.

7. The system according to claim 1, further comprising initiating utilization of the electronic card and one or more portions thereof.

8. A computer implemented method to manage electronic vendor offers, wherein the electronic vendor offers include discount offers associated with electronic cards, the method comprising:
providing, via a vendor offer manager, an electronic card for display via a graphical user interface at a user device, the electronic card provided for display having a front face image and a rear face image that has a selectable electronic vendor offer;
receiving a user selection, at an image rotation icon, to rotate between the front face image and the rear face image of the electronic card provided for display;
in response to rotating between the front face image and the rear face image, receiving a selection of the selectable electronic vendor offer on the rear face image of the electronic card; and
facilitating redemption of the selectable electronic vendor offer based on and in response to receiving the selection of the selectable electronic vendor offer on the rear face image.

9. The method according to claim 8, wherein when the electronic card is provided for display, the front face image of the electronic card includes one or more of: front face discount card data associated with the selectable electronic vendor offer and links to the front face discount card data,
wherein the front face discount data includes one or more of: identification data of the electronic card, contact information data associated with the electronic card, terms and conditions data associated with the electronic card, and expiration data of the electronic card; and the rear face image of the electronic card includes one or more of: rear face discount card data associated with the selectable electronic vendor offer and links to the rear face discount card data, wherein the rear face discount card data includes one or more offers data provided by the electronic card;
wherein when the electronic card is an loyalty card that is provided for display, the front face image of the electronic loyalty card includes one or more of: front face loyalty card data and links to the front face loyalty card data, wherein the front face loyalty card data includes one or more of: identification data of the electronic loyalty card, contact information data associated with the electronic loyalty card, terms and conditions data associated with the electronic loyalty card, and expiration data of the electronic loyalty card; and the rear face image of the electronic loyalty card includes one or more of: rear face loyalty card data and links to the rear face loyalty card data, wherein the rear face loyalty card data includes the one or more of: offers data provided by the electronic loyalty card, user usage data of the electronic loyalty card, or tracking of user loyalty data; and
wherein when the electronic card is an electronic coupon that is provided for display, the front face image of the electronic coupon includes one or more of: front face coupon data and links to the front face coupon data, wherein the front face coupon data includes one or more of: identification data of the electronic coupon, contact information data associated with the electronic coupon, terms and conditions data associated with the electronic coupon, and expiration data of the electronic coupon; and the rear face image of the electronic coupon includes one or more of: rear face coupon data and links to the rear face coupon data, wherein the rear face coupon data includes the one or more offers data provided by the electronic coupon.

10. The method according to claim 9, further comprising: searching for the electronic card according to a user-provided search criteria.

11. The method according to claim 9, further comprising: activating one or more of the electronic card.

12. The method according to claim 9, further comprising: utilizing one or more of the electronic card and one or more portions thereof.

13. One or more non-transitory computer-readable media having computer-executable instructions embodied thereon for performing a method of managing electronic vendor offers, the method comprising:
- providing, via a vendor offer manager, an electronic card for display via a graphical user interface at a user device, the electronic card provided for display having a front face image and a rear face image that has a selectable electronic vendor offer;
- receiving a user selection, at an image rotation icon, to rotate between the front face image and the rear face image of the electronic card provided for display;
- receiving a selection of the selectable electronic vendor offer on the rear face image of the electronic card; and
- facilitating redemption of the selectable electronic vendor offer based on receiving the selection of the selectable electronic vendor offer and receiving the user selection to rotate between the front face image and the rear face image.

14. The media according to claim 13, wherein when the electronic card is an electronic discount card that is provided for display, the front face image of the electronic discount card includes one or more of: front face discount card data and links to the front face discount card data, wherein the front face discount data includes one or more of: identification data of the electronic discount card, contact information data associated with the electronic discount card, terms and conditions data associated with the electronic discount card, and expiration data of the electronic discount card; and the rear face image of the electronic discount card includes one or more of: rear face discount card data and links to the rear face discount card data, wherein the rear face discount card data includes one or more offers data provided by the electronic discount card;
- wherein when the electronic card is an electronic loyalty card that is provided for display, the front face image of the electronic loyalty card includes one or more of: front face loyalty card data and links to the front face loyalty card data, wherein the front face loyalty card data includes one or more of: identification data of the electronic loyalty card, contact information data associated with the electronic loyalty card, terms and conditions data associated with the electronic loyalty card, and expiration data of the electronic loyalty card; and the rear face image of the electronic loyalty card includes one or more of: rear face loyalty card data and links to the rear face loyalty card data, wherein the rear face loyalty card data includes one or more of: one or more offers data provided by the electronic loyalty card, user usage data of the electronic loyalty card, or tracking of user loyalty data; and
- wherein when the electronic card is an electronic coupon that is provided for display, the front face image of the electronic coupon includes one or more of: front face coupon data and links to the front face coupon data, wherein the front face coupon data includes one or more of: identification data of the electronic coupon, contact information data associated with the electronic coupon, terms and conditions data associated with the electronic coupon, and expiration data of the electronic coupon; and the rear face image of the electronic coupon includes one or more of: rear face coupon data and links to the rear face coupon data, wherein the rear face coupon data includes one or more of the electronic vendor offers provided by the electronic coupon.

15. The media according to claim 13, wherein the method further comprises:
- searching for electronic discount cards according to a user-provided search criteria;
- activating the electronic discount cards; and
- providing a list of the activated electronic discount cards, the list ordered based on vendor location relative to the user device.

16. The system according to claim 1, further comprising entering an authentication code to confirm the redemption of the selectable electronic vendor offer, the authentication code comprising a QR code.

17. The system according to claim 1, further comprising:
- receiving an indication of a geographical location from the user device, the geographical location based on a GPS or cellular identified location; and
- based on the indication, providing the electronic card via the electronic vendor offer manager.

18. The media according to claim 14, further comprising:
- upon redeeming the selectable electronic vendor offer based on receiving the user selection to rotate between the front face image and the rear face image, designating an indicator of the electronic loyalty card as fulfilled.

19. The media according to claim 14, further comprising:
- upon receiving the selection of an icon of the selectable electronic vendor offer associated with the front face image or the rear face image, providing information associated with conditions of the selectable electronic vendor offer.

20. The media according to claim 14, further comprising updating the electronic card upon facilitating the redemption of the selectable electronic vendor offer to reflect the redemption.

* * * * *